(12) United States Patent
Ogo

(10) Patent No.: US 10,910,654 B2
(45) Date of Patent: Feb. 2, 2021

(54) ELECTRIC POWER GENERATION METHOD USING ELECTRODE CATALYST FOR FUEL CELL

(71) Applicant: JAPAN SCIENCE AND TECHNOLOGY AGENCY, Kawaguchi (JP)

(72) Inventor: Seiji Ogo, Itoshima (JP)

(73) Assignee: Japan Science and Technology Agency, Saitama (JP)

( * ) Notice: Subject to any disclaimer, the term of this patent is extended or adjusted under 35 U.S.C. 154(b) by 303 days.

(21) Appl. No.: 15/612,992

(22) Filed: Jun. 2, 2017

(65) Prior Publication Data

US 2017/0271686 A1    Sep. 21, 2017

Related U.S. Application Data

(62) Division of application No. 13/377,327, filed as application No. PCT/JP2010/059773 on Jun. 9, 2010, now abandoned.

(30) Foreign Application Priority Data

Oct. 6, 2009    (JP) ................................ 2009-139401

(51) Int. Cl.
   *H01M 4/90*    (2006.01)
(52) U.S. Cl.
   CPC ................................. *H01M 4/9008* (2013.01)
(58) Field of Classification Search
   CPC ................................................... H01M 4/9008
   USPC ....................................................... 429/531
   See application file for complete search history.

(56) References Cited

U.S. PATENT DOCUMENTS

| | | | |
|---|---|---|---|
| 2004/0236157 A1 | 11/2004 | Heilgendorff et al. | |
| 2006/0079393 A1 | 4/2006 | Matsumoto | |
| 2010/0129698 A1 | 5/2010 | Okada et al. | |
| 2012/0100462 A1 | 4/2012 | Ogo | |

FOREIGN PATENT DOCUMENTS

| | | | |
|---|---|---|---|
| DE | 2046354 | 3/1972 | |
| DE | 2125590 | 12/1972 | |
| EP | 2133145 | 12/2009 | |
| JP | 2002-329500 | 11/2002 | |
| JP | 2004-031174 | 1/2004 | |
| JP | 2004-532734 | 10/2004 | |
| JP | 2005-228497 | 8/2005 | |
| JP | 2005-255600 | 9/2005 | |
| JP | 2006-085976 | 3/2006 | |
| JP | 2007-149436 | 6/2007 | |
| JP | 2007-173173 | 7/2007 | |
| JP | 2007-273371 | * 10/2007 | ........... Y02E 60/523 |
| JP | 2008-189837 | 8/2008 | |
| JP | 2008-204894 | 9/2008 | |
| JP | 2008-218041 | 9/2008 | |
| KR | 100759431 | 10/2007 | |
| WO | 2008/111569 | 9/2008 | |

OTHER PUBLICATIONS

Machine English language translation of JP 2007-273371 (A)—Oct. 18, 2007 "Oxygen Reduction Composite Catalyst, Its Manufacturing Method, and Fuel Cell Using It" by Sakashita Masao et al. (Year: 2007).*
"A Dinuclear Ni(mu-H)Ru Complex Derived from H2" by Seiji Ogo et al. in Science vol. 316, Apr. 27, 2007 p. 585-287 (Year: 2007).*
Ogo et al. "A Dinuclear Ni(μ-H)Ru Complex Derives from H2" Science 316:585-587 (2007).
Kure et al. "pH-Dependent isotope Exchange and Hydrogenation Catalysed by Water-Soluble NiRu Complexes as Functional Models for [NiFe]hydrogenases" Dalton Trans. 2008:4747-4755 (2008).
Kanda et al. "A Chemical Redox Reaction Following the Reduction of a Modified Electrode" J. Electroanal. Chem. 375:243-246 (1994).
Sebastian et al. "Development of $Mo_xRu_ySe_z(CO)_n$ Electrocatalysts by Screen Printing and Sintering for Fuel Cell Applications" Surface Engineering 16:43-46 (2000).
Bezerra et al. "Novel Carbon-Supported Fe—N Electrocatalysts Synthesized Through Heat Treatment of Iron Tripyridyl Triazine Complexes for the PEM Fuel Cell Oxygen Reduction Reaction" Electrochimica Acta 53:7703-7710 (2008).
Bashyam et al. "A Class of Non-Precious Metal Composite Catalysts for Fuel Cells" Nature 443:63-66 (2006).
Yamazaki et al. "A Direct CO Polymer Electrolyte Membrane Fuel Cell" Angewandte Chemie Int'l Ed. 45:3120-3122 (2006).
Jelliss et al. "Unique Properties of a Perfluoroalkyl-Modified 2,2-Bipyridyl Ruthenium Complex in a Nafion Membrane: Attenuated Leaching of a Potential Biofuel Cell Redox Mediator" J. Materials Chem. 18:2104-2111 (2008).
Tam et al. "Biochemically Controlled Bioelectrocatalytic Interface" J. Am. Chem. Soc. 130:10888-10889 (2008).
Osterloh et al. "Synthesis, X-Ray Structure and Electrochemical Characterisation of a Binuclear thiolate Bridged Ni—Fe-Nitrosyl Complex, Related to the Active Site of NiFe Hydrogenase" Chem, Comm. 1997:979-980 (1997).
Liaw et al. "Heterobimetallics of Nickel-Iron Dinitrosyl: Electronic Control by Chelate and Diatomic Ligands" Inorganic Chem. 39:480-484 (2000).
Davies et al. "Synthesis and Structure of a Thiolate-Bridged Nickel-Iron Complex Towards a Mimic of the Active Site of NiFe-hydrogenase" Chem. Comm. 1999:1935-1936 (1999).
Sellman et al. "[$(C_6H_4S_2)$ Ni(μ-'$S_3$·) $_{Fe(CO)(PMe3)}$)$_2$]: A Dinuclear [NiFe] Complex Modeling the {RS)$_2$Ni(μ-SR)$_2$Fe (CO)(L)$_2$ Core of [NiFe] Hydrogenase Centers" Angewandte Chemie Int'l Ed. 41:632-634 (2002).

(Continued)

Primary Examiner — Jonathan G Jelsma
Assistant Examiner — Omar M Kekia
(74) Attorney, Agent, or Firm — Nixon & Vanderhye P.C.

(57) ABSTRACT

To provide an economical fuel cell electrode catalyst which can be used in place of platinum as a simple substance or a platinum alloy and has easy-to-control catalytic power, a molecular metal complex is used as a fuel cell electrode catalyst which molecular metal complex is a mononuclear or multinuclear coordination compound that has a particular structure, that is not a polymer compound, and that does not have a layered structure.

4 Claims, No Drawings

(56) References Cited

OTHER PUBLICATIONS

Zhu et al. "Modulation of the Electronic Structure and the Ni—Fe Distance in Heterobimetallic Models for the Active Site in [NiFe] Hydrogenase" Proc. Natl. Acad. Sci. USA 102:18280-18285 (2005).

Li et al. "Dithiolato-Bridged Dinuclear Iron-Nickel Complexes [Fe(CO)$_2$(CN)$_2$(μ-SCH$_2$CH$_2$CH$_2$S)Ni(S$_2$CNR$_2$)] Modeling the Active Site of [NiFe] Hydrogenase" J. Am. Chem. Soc. 127:8950-8951 (2005).

Ohki et al. "Thiolate-Bridged Dinuclear Iron (tris-carbonyl)-Nickel Complexes Relevant to the Active Site of [NiFe] Hydrogenase" Proc. Natl. Acad. Sci. USA 105:7652-7657 (2008).

Ichikawa et al. "Critical Aspects of [NiFe]Hydrogenase Ligand Composition" Dalton Trans. 2009:4304-4309 (2009).

Lyon et al. "Carbon Monoxide and Cyanide Ligands in a Classical Organometallic Complex Model for Fe-Only Hydrogenase" Angewandte Chemie Int'l Ed. 38:3178-3180 (1999).

Schmidt et al. First Generation Analogues of the Binuclear Site in the Fe-Only Hydrogenases: Fe$_2$(μ- SR)$_2$(CO)$_4$(CN)$_2{}^{2-}$ J. Am. Chem. Soc. 121:9736-9737 (1999).

Razavet et al. "{2Fe3S} Clusters Related to the Di-Iron Sub-Site of the H-Centre of All-Iron Hydrogenases" Chem. Comm. 2001:847-848 (2001).

Ott et al. "A Biomimetic Pathway for Hydrogen Evolution from a Model of the Iron Hydrogenase Active Site" Angewandte Chemie Int'l Ed. 43:1006-1009 (2004).

Gao et al. "Binuclear Iron-Complexes with Bidentate Phosphine Ligands as Active Site Models of Fe-Hydrogenase and Their Catalytic Proton Reduction" Inorganic Chem. 46:1981-1991 (2007).

Song et al. "The N-Acylated Derivatives of Parent Complex [{μ-SCH$_2$)$_2$NH}Fe$_2$(CO)$_6$] as Active Site Models of Fe-Only Hydrogenases: Synthesis, Characterization, and Related Properties" Eur. J. Inorganic Chem. 2008:291-297 (2008).

Ogo et al. "pH-Dependent Transfer Hydrogenation, Reductive Amination, and Dehalogenation of Water-Soluble Carbonyl Compounds and Alkyl Halides Promoted by Cp*Ir Complexes" Organometallics 20:4903-4910 (2001).

Reynolds et al. "Ruthenium Derivatives of NiS$_2$N$_2$ Complexes as Analogues of Bioorganometallic Reaction Centers" Organometallics 22:1619-1625 (2003).

Sellmann et al. "Heterolytic Cleavage of H$_2$ at a Sulfur-Bridged Dinuclear Ruthenium Center" Angewandte Chemie Int'l Ed. 43:1877-1880 (2004).

Linck et al. "Heterolytic and Homolytic Activation of Dihydrogen at an Unusual Iridium (II) Sulfide" J. Am. Chem. Soc. 123:8856-8857 (2001).

Lopez et al. "Mechanistic Study of Hydrogen Activation by Cationic Dinuclear (μ-Sulfido) molybdenum Complexes" Organometallics, 11:2424-2435 (1992).

Bianchini et al. "Reversible Double Addition of H$_2$ on a Bis(μ-sulfido) Binuclear Rhodium Complex" Inorganic Chem. 25:4617-4618 (1986).

Ienco et al. "Activation of Molecular Hydrogen over a Binuclear Complex with Rh$_2$S$_2$ Core: DFT Calculations and NMR Mechanistic Studies" J. Am. Chem. Soc. 126:11954-11965 (2004).

Ogo et al. "pH-Dependent H$_2$-Activation Cycle Coupled to Reduction of Nitrate Ion by Cp*Ir Complexes" J. Am. Chem. Soc, 124:597-601 (2002).

Ogo et al. "Synthesis of a Linear-Type Pentanuclear (Rh$^{III}$-W$^{VI}$-Cu$^{I}$-W$^{VI}$-Rh$^{III}$) Sulfide Cluster Predicted by Fast Atom Bombardment Mass Spectrometry" J. Cluster Sci. 6:421-436 (1995).

Vieille-Petit et al. "Synthesis and Characterization of Tetrahedral Ru$_3$O Clusters with Intrinsic Framework Chirality: A Chiral Probe of the Intact Cluster Catalysis Concept" Organometallics 24:6104-6119 (2005).

Int'l Preliminary Report on Patentability for PCT/JP2010/059773, five pages, dated Dec. 12, 2011.

Supplementary European Search Report for related application EP 10786194.0, eight pages, dated Jan. 26, 2015.

International Search Report for PCT/JP2010/059773, two pages, dated Sep. 14, 2010.

Written Opinion of the ISA for PCT/JP2010/059773, five pages, dated Sep. 14, 2010.

* cited by examiner

ELECTRIC POWER GENERATION METHOD USING ELECTRODE CATALYST FOR FUEL CELL

This application is a divisional of application Ser. No. 13/377,327, filed Dec. 9, 2011, now pending; which is the U.S. national stage of Int'l Application No. PCT/JP2010/059773, filed Jun. 9, 2010; which claims priority benefit of JP 2009-139401, filed Jun. 10, 2009; the entire contents of which are hereby incorporated by reference.

TECHNICAL FIELD

The present invention relates to an electrode catalyst for a fuel cell (fuel cell electrode catalyst) and use thereof. Particularly, the present invention relates to (i) an economical fuel cell electrode catalyst which can be used in place of platinum as a simple substance or a platinum alloy and has easy-to-control catalytic power, and (ii) use thereof.

BACKGROUND ART

Conventionally, a typical fuel cell electrode catalyst has been a platinum catalyst. However, the platinum catalyst is expensive and an exhaustible resource. Therefore, a lot of research has been done to develop an economical fuel cell electrode catalyst which can be used in place of the platinum catalyst, and various electrode catalysts therefor have been reported so far.

As such the electrode catalysts, a heat-treated metal complex, a layered metal complex, a polymer metal complex, etc. have been reported.

Examples of the heat-treated metal complex are as follows. A heat-treated iron complex including, as a ligand, 2,4,6-tris(2-pyridyl)-1,3,5-triazine has been reported to exhibit oxygen reduction ability (see Non-Patent Literature 1). Further, a heat-treated cobalt complex including a porphyrin derivative as a ligand has been disclosed as the electrode catalyst (see Patent Literature 1). Furthermore, heat-treated mononuclear and dinuclear complexes each having a phenolate skeleton have been disclosed as the electrode catalyst (see Non-Patent Literature 2). In cases of each of these heat-treated metal complexes, at the point of synthesis of a catalyst, a metal complex is burned at a high temperature. Consequently, the metal complex is thermally decomposed, so that the heat-treated metal complex no longer maintains its complex structure. Namely, each of the above heat-treated metal complexes is not a complex but a metal catalyst.

Examples of the layered metal complex are as follows. A layered metal complex including a dithiooxamide derivative as a ligand has been reported as the electrode catalyst (see Patent Literature 3). Further, an interlayer metal complex including a cobalt complex which includes a dithiooxamide derivative as a ligand and into which platinum is inserted has been reported as the electrode catalyst (see Patent Literature 4).

Examples of the polymer metal complex are as follows. A polymer metal complex including pyrrole which is polymerized with hydrogen peroxide and coordinates to cobalt has been reported as the electrode catalyst (see Non-Patent Literature 2). Further, a polymer metal complex of cobalt including a polymerized ligand has been reported to function as the electrode catalyst (see Patent Literature 5).

Additionally, it has been reported that, in a solid polymer fuel cell which uses a carbon monoxide directly as a fuel, a rhodium complex including a porphyrin derivative as a ligand is used as an anode catalyst (see Non-Patent Literature 3).

Furthermore, it has been reported that a ruthenium complex and an osmium complex are used as a part of a biotechnological fuel cell and work for electron transfer, although the ruthenium complex and the osmium complex do not constitute a fuel cell electrode catalyst (See Non-Patent Literatures 4 and 5).

CITATION LIST

Patent Literatures

Patent Literature 1

Japanese Patent Application Publication (Translation of PCT Application), Tokuhyo, No. 2004-532734 A (Publication Date: Oct. 28, 2004)

Patent Literature 2

International Application, Pamphlet of WO No. 2008/111569 (Publication Date: Sep. 18, 2008)

Patent Literature 3

Japanese Patent Application Publication, Tokukai, No. 2004-031174 A (Publication Date: Jan. 29, 2004)

Patent Literature 4

Japanese Patent Application Publication, Tokukai, No. 2008-204894 A (Publication Date: Sep. 4, 2008)

Patent Literature 5

Japanese Patent Application Publication, Tokukai, No. 2008-189837 A (Publication Date: Aug. 21, 2008)

Non-Patent Literatures

Non-Patent Literature 1

Bezerra (C. W. B. Bezerra) and other nine members, Electrochimica Acta, Vol. 53, p. 7703, 2008

Non-Patent Literature 2

Bashyam (R. Bashyam) and other one member, Nature, Vol. 443, p. 63, 2006

Non-Patent Literature 3

Yamazaki (S. Yamazaki) and other four members, Angew. Chem. Int. Ed. 2006, 45, 3120-3122

Non-Patent Literature 4

Jelliss (P. A. Jelliss) and other five members, Journal of Materials Chemistry, Vol. 18, p. 2104, 2008

Non-Patent Literature 5

Tam (T. K. Tam) and other five members, Journal of the American Chemical Society, Vol. 130, p. 10888, 2008

SUMMARY OF INVENTION

Technical Problem

However, it is impossible to easily control catalytic power of the above conventional fuel cell electrode catalysts.

Specifically, each of the heat-treated metal complexes is merely a metal catalyst. Further, each of the above layered metal complexes, the polymer metal complexes, etc. has a layered structure or a structure in which a polymer coordinates to a metal atom. Therefore, it is impossible to freely design a ligand of each of these metal complexes. Namely, it is impossible to easily control the catalytic power of the metal complexes.

Further, the metal catalyst disclosed in Non-Patent Literature 3 includes the porphyrin derivative as the ligand. Therefore, it is difficult to make a great modification in the structure of this metal catalyst in order to control its catalytic power.

Note that each of the metal complexes disclosed in Non-Patent Literatures 4 and 5 does not function as the fuel cell electrode catalyst.

The present invention was made in view of the above problems, and an object of the present invention is to provide an economical fuel cell electrode catalyst which can be used in place of platinum as a simple substance or a platinum alloy and has easy-to-control catalytic power.

Solution to Problem

The inventors of the present invention made diligent studies in order to attain the above object. As a result, the inventors of the present invention reached the unique finding that use of a molecular metal complex having a certain structure makes it possible to provide an economical fuel cell electrode catalyst which can be used in place of platinum as a simple substance or a platinum alloy and has easy-to-control catalytic power. Consequently, the inventors of the present invention completed the present invention.

A fuel cell electrode catalyst of the present invention includes one or more molecular metal complexes, each of the one or more molecular metal complexes being a metal complex (i) having a molecular weight of 2000 or less, (ii) not having a layered structure, and (iii) including a total of one or more but not more than three metal atoms and/or metal ions to each of which three or more but not more than six ligands coordinate, each of the one or more molecular metal complexes being a metal complex other than a porphyrin derivative, in a case where (i) the each of the one or more molecular metal complexes includes one metal atom or one metal ion and (ii) four ligands coordinate to the one metal atom or the one metal ion.

The molecular metal complex included in the fuel cell electrode catalyst of the present invention is not a polymer compound and does not have a layered structure. Therefore, it is possible to thermodynamically and kinetically control reaction of the molecular metal complex with hydrogen or oxygen. Further, the molecular metal complex is water-soluble and stable in water. Therefore, the molecular metal complex is very effective as an electrode catalyst in a fuel cell which uses (i) hydrogen including saturated steam and (ii) oxygen. Furthermore, the molecular metal complex has high flexibility in designing of the structure of the ligand. Therefore, it is possible to easily control the catalytic power by changing the ligand. Namely, with the molecular metal complex, it is possible to easily control electronic effects, and also to ravel a mechanism of electrode reaction.

Advantageous Effects of Invention

As described above, a fuel cell electrode catalyst of the present invention includes one or more molecular metal complexes, each of the one or more molecular metal complexes being a metal complex (i) having a molecular weight of 2000 or less, (ii) not having a layered structure, and (iii) including a total of one or more but not more than three metal atoms and/or metal ions to each of which three or more but not more than six ligands coordinate, each of the one or more molecular metal complexes being a metal complex other than a porphyrin derivative, in a case where (i) the each of the one or more molecular metal complexes includes one metal atom or one metal ion and (ii) four ligands coordinate to the one metal atom or the one metal ion.

According to the above arrangement of the fuel cell electrode catalyst of the present invention, it is possible to provide an economical fuel cell electrode catalyst which can be used in place of platinum as a simple substance or a platinum alloy and has easy-to-control catalytic power. Namely, the use of the above molecular metal complex as the fuel cell electrode catalyst makes it possible to freely and precisely design the ligand, thereby enabling to freely control the nature of the electrode complex catalyst. Furthermore, the above molecular metal complex has such a structure that it would not be burned at a high temperature. Therefore, it is possible to provide a fuel cell electrode catalyst maintaining a chemical structure of a metal complex.

DESCRIPTION OF EMBODIMENTS (I) Fuel Cell Electrode Catalyst of the Present Invention In order to provide a fuel cell electrode catalyst having easy-to-control catalytic power, it is considered to be necessary to use a chemical species whose chemical structure can be freely designed so that reaction of the chemical species with hydrogen or oxygen can be controlled thermodynamically and kinetically.

Conventionally, a lot of attempts have been made to use an organic metal complex as the fuel cell electrode catalyst. However, the organic metal complex has been considered not to function as the catalyst. Therefore, it has almost never reported that a molecular metal complex can be used as the fuel cell electrode catalyst. Only such report has been made in Non-Patent Literature 3, which describes that the rhodium complex including the porphyrin derivative as the ligand has a catalytic property only in the hydrogen electrode.

However, as described above, this rhodium complex includes, as the ligand, the porphyrin derivative having a porphyrin structure. Therefore, even by modifying the structure of the ligand, it is impossible to significantly change the complex structure. Namely, this rhodium complex is not the one having easy-to-control catalytic power. Meanwhile, the inventors of the present invention used, as the fuel cell electrode catalyst, molecular metal complexes that the inventors of the present invention had developed so far. As a result, the inventors of the present invention found for the first time that a molecular metal complex can function as the fuel cell electrode catalyst.

(I-1) Molecular Metal Complex

A fuel cell electrode catalyst of the present invention is a fuel cell electrode catalyst including one or more molecular metal complexes, each of the one or more molecular metal complexes being a metal complex (i) including a total of one or more but not more than three metal atoms and/or metal ions to each of which three or more but not more than six ligands coordinate, (ii) having a molecular weight of 2000 or less, and (iii) not having a layered structure. Each of the one or more molecular metal complexes is a metal complex other than a porphyrin derivative, in a case where (i) said each of the one or more molecular metal complexes includes one metal atom or one metal ion and (ii) four ligands coordinate to the one metal atom or the one metal ion. This electrode catalyst may be either a solid or a solution.

In the present invention, the molecular metal complex refers to a mononuclear or multinuclear coordination compound whose central atom or central ion is a metal atom or a metal ion and which is not a polymer and does not have a layered structure. Note that the expression that "a coordination compound is not a polymer compound" means that the coordination compound is not a polymer complex or a coordination polymer and has a molecular weight of 2000 or less.

Namely, the molecular metal complex is not a polymer complex in which a lateral group of a polymer serves as a ligand so as to form coordinate bond with a metal atom or a metal ion. In other words, the ligand included in the molecular metal complex is a low-molecular-weight molecule or ion, more preferably an unpolymerized molecule or ion. Further, the molecular metal complex is not a polymer which is made of a low-molecular-weight organic polydentate ligand and a metal atom or a metal ion and which is a coordination polymer whose main chain includes repeating units coordinate-bonded to each other. Note that the expression "low-molecular-weight" means a molecular weight of 2000 or less. Note also that the expression "a coordination compound does not have a layered structure" means that the coordination compound is not the above-described layered metal complex (e.g., Patent Literature 3) or the interlayer metal complex (e.g., Patent Literature 4).

The molecular metal complex is a metal complex other than a porphyrin derivative, in a case where (i) the molecular metal complex includes one metal atom or one metal ion and (ii) four ligands coordinate to the one metal atom or the one metal ion. The "porphyrin derivative" herein is used synonymously with a "porphyrin complex". Examples of the porphyrin derivative include (α,β,γ,δ-tetraphenylporphine)iron(II), (1,2,3,4,5,6,7,8-octaethylporphine)iron(II), and the like. Herein, the molecular metal complex including (i) one metal atom or one metal ion and (ii) four ligands coordinating to the one metal atom or the one metal ion is not a porphyrin derivative.

The molecular metal complex includes, in its molecule, a total of one or more but not more than three metal atoms and/or metal ions to each of which three or more but not more than six ligands coordinate. For example, a molecular metal complex expressed by the later-described General Formula (9) includes, in its molecule, $M^{13}$ and $M^{14}$, i.e., a total of (i) two metal atoms, (ii) two metal ions, or (iii) one metal atom and one metal ion. Further, $L^{41}$ through $L^{44}$, i.e., four ligands coordinate to $M^{13}$, whereas $L^{43}$ through $L^{46}$, i.e., four ligands coordinate to $M^{14}$.

The metal atom or the metal ion is not limited to any specific kind. Examples of the metal atom or the metal ion encompass metal atoms or metal ions of 3A group elements (Sc, Y), 4A group elements (Ti, Zr, Hf, Rf), 5A group elements (V, Nb, Ta, Db), 6A group elements (Cr, Mo, W, Sg), 7A group elements (Mn, Tc, Re, Bh), 8 group elements (Fe, Ru, Os, Hs, Co, Rh, Ir, Mt, Ni, Pd, Pt, Uun), 1B group elements (Cu, Ag, Au, Uuu), 3B group elements (Al, Ga, In, Tl), and 6B group elements (Se, Te, Po) in a periodic table. Note that the periodic table herein refers to the periodic table defined in page 1079, Table 1 of "*Tokyo Kagaku Doujin, Kagaku Daijiten*, First Edition" Ed. Michinori Ohki et al., published on Oct. 20, 1989, Tokyo Kagaku Doujin.

Among these, the metal atom or the metal ion is more preferably one or more kinds selected from the metal atoms or the metal ions of the 6A group elements, the 7A group elements, and the 8 group elements, specifically, atoms or ions of Cr, Mn, Fe, Co, Ni, Mo, Tc, Ru, Rh, Pd, Ag, W, Re, Os, Ir, and the like. Alternatively, the metal atom or the metal ion may be selected from the metal atoms or the metal ions of the 8 group elements.

The metal ion may have any valence, as long as the valence is possible for the metal.

The "ligand" herein refers to a molecule or an ion that is coordinate-bonded to a certain atom, as described in page 1751 of "*Tokyo Kagaku Doujin, Kagaku Daijiten*, First Edition" Ed. Michinori Ohki et al., published on Oct. 20, 1989, Tokyo Kagaku Doujin.

The ligand is not limited to any specific kind, as long as it is a low-molecular-weight molecule or ion. Preferably, each of ligand atoms of the ligands included in the molecule is independently a hydrogen atom, a carbon atom, a nitrogen atom, an oxygen atom, a phosphor atom, a sulfur atom, or a halogen atom. Examples of the halogen atom encompass a fluorine atom, a chlorine atom, a bromine atom, and an iodine atom. Note that the "ligand atom" herein refers to an atom which is included in the ligand and directly involves coordinate bond with the metal atom or the metal ion.

The molecular metal complex of the present invention has a low molecular weight, and has a relatively simple structure as compared with complexes having layered structures such as the layered metal complex and the interlayer metal complex. Therefore, the molecular metal complex of the present invention has high flexibility in designing of the ligand. Accordingly, it is easy to control the catalytic power of the molecular metal complex of the present invention. Furthermore, the molecular metal complex of the present invention would not be burned even at a high temperature. Therefore, even at a high temperature, the molecular metal complex of the present invention would not be changed into a mere metal catalyst, and accordingly can maintain a structure of a metal complex. The inventors of the present invention designed various complexes as the above molecular metal complex, and found that each of these complexes functions as the fuel cell electrode catalyst.

Preferably, the one or more molecular metal complexes include one or more molecular metal complexes selected from molecular metal complexes expressed by the following General Formulae (1) through (73):

Chem. 1

(1)

(2)

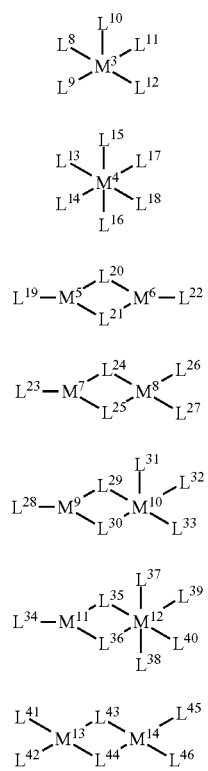
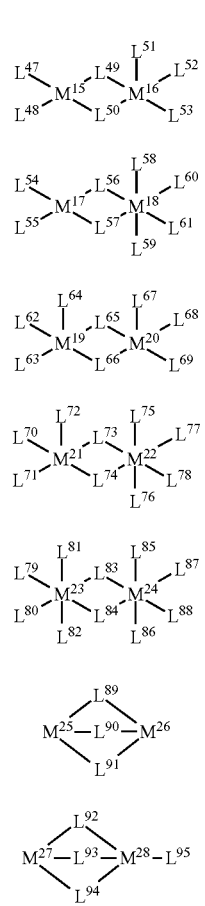
Chem. 2
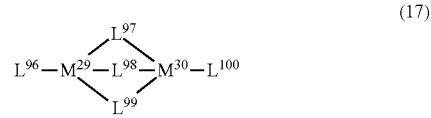
(17)
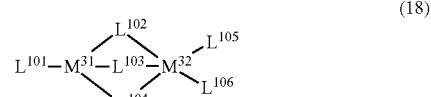
(18)
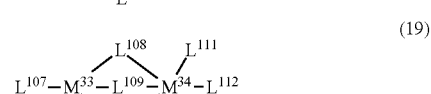
(19)
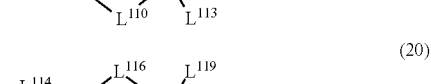
(20)
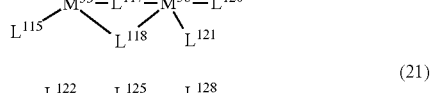
(21)
Chem. 3
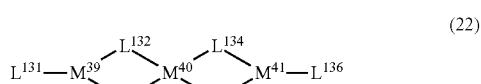
(22)
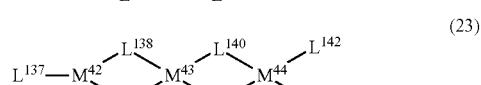
(23)
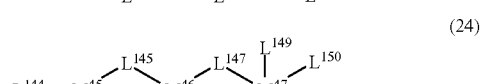
(24)
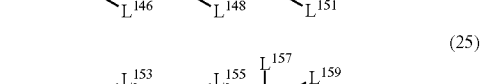
(25)
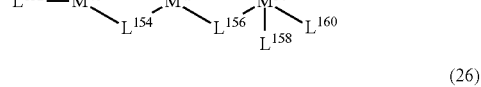
(26)
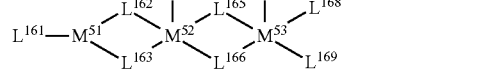
(27)
Chem. 4
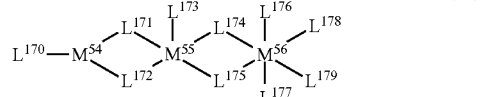
(28)
(29)

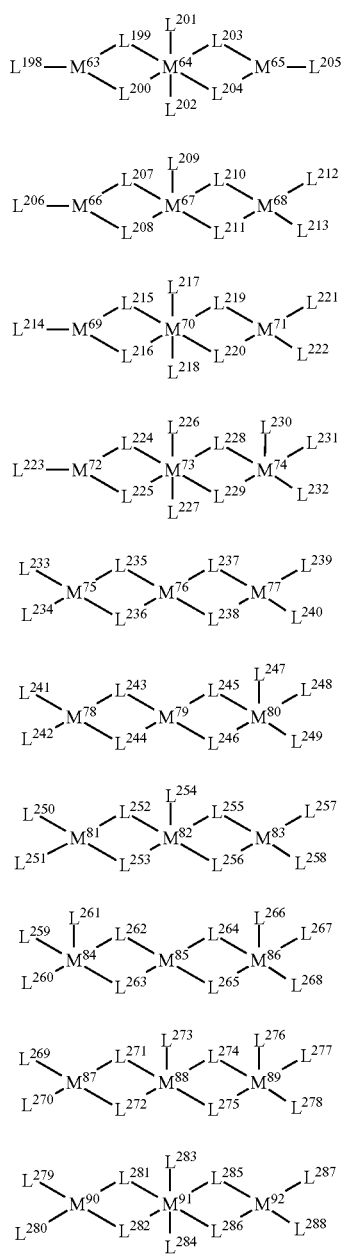
Chem. 5
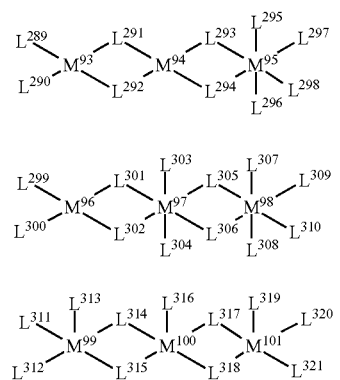
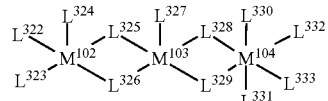
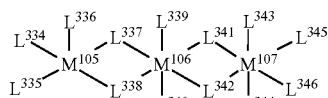
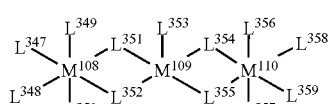
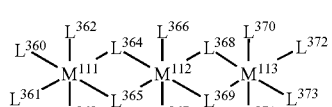
Chem. 6
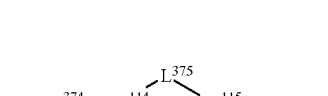
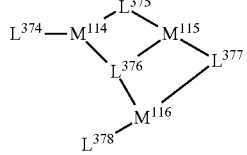
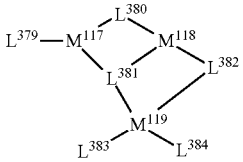
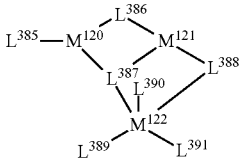
Chem. 7
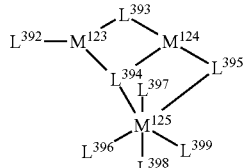
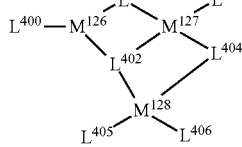
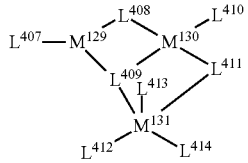

-continued
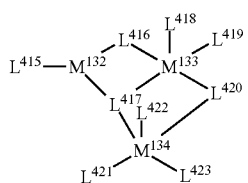
(53)
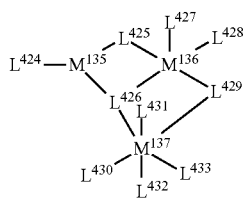
(54)
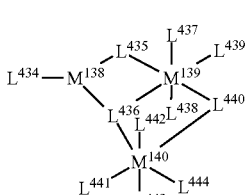
(55)
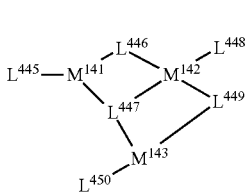
(56)
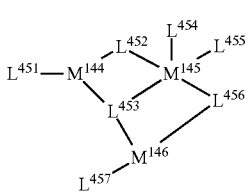
(57)
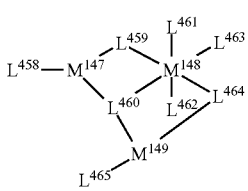
(58)
Chem. 8
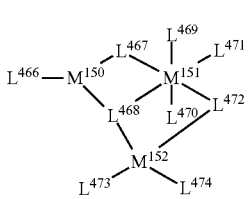
(59)
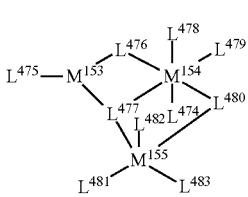
(60)
-continued
Chem. 9
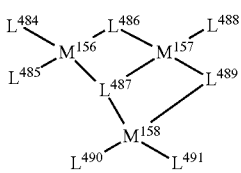
(61)
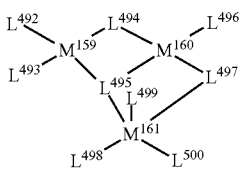
(62)
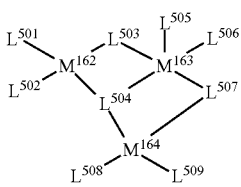
(63)
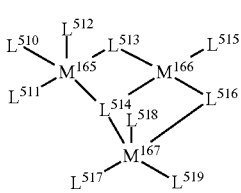
(64)
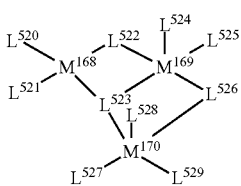
(65)
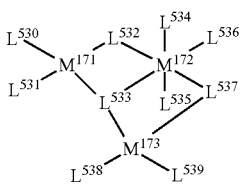
(66)
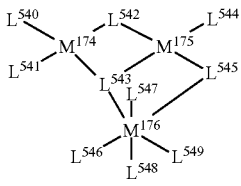
(67)
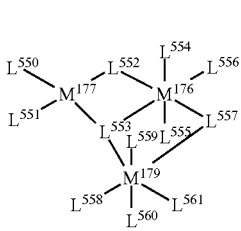
(68)

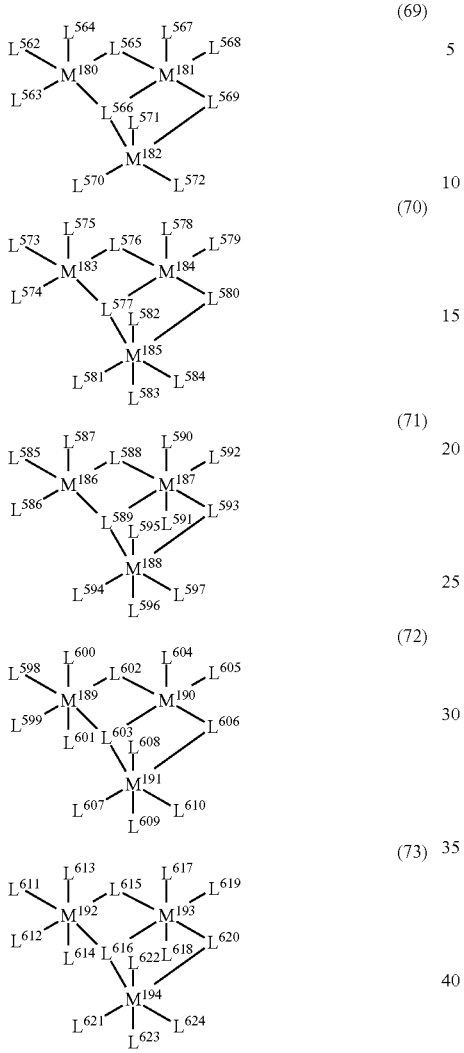

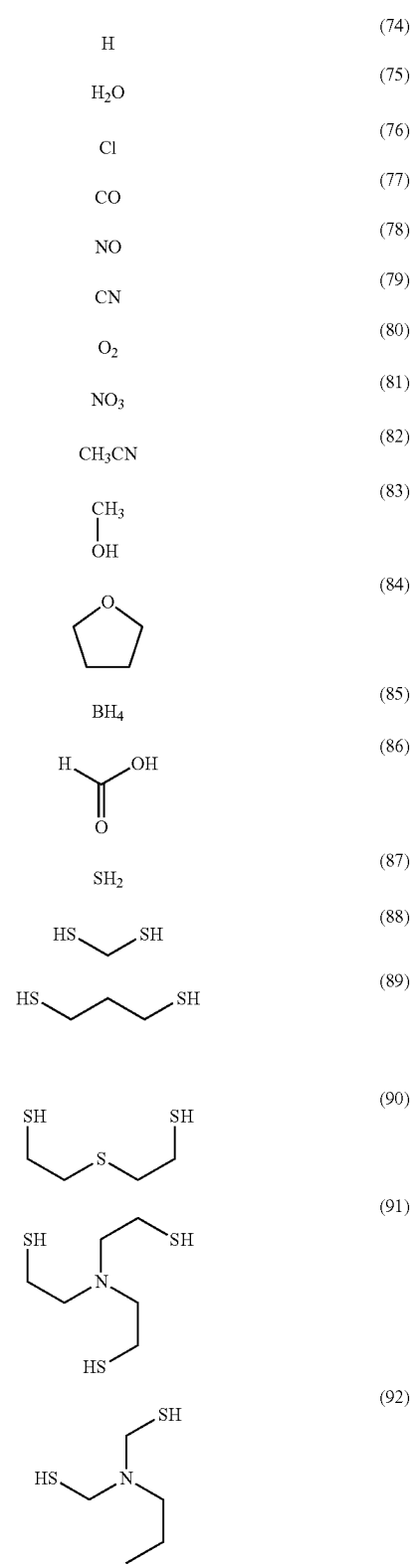

where each of $L^1$ through $L^{624}$ independently indicates a ligand, each of $M^1$ through $M^{194}$ independently indicates a metal atom or a metal ion, and the molecular metal complex expressed by the General Formula (2) is a metal complex other than a porphyrin derivative.

Further preferably, the one or more molecular metal complexes selected from the molecular metal complexes expressed by the General Formulae (1) through (73) include one or more molecular metal complexes selected from the molecular metal complexes expressed by the General Formulae (5) through (21). The later-described Examples indicate that the dinuclear molecular metal complexes expressed by the General Formulae (5) through (21) include molecular metal complexes exhibiting high electromotive forces.

As $M^1$ through $M^{194}$, the above-described metal atoms or metal ions can be used. Each of $L^1$ through $L^{624}$ independently indicates a ligand. As described above, the ligand is not limited to any particular kind, as long as it is a low-molecular-weight molecular or ion. Preferably, each of ligand atoms of $L^1$ through $L^{624}$ is independently a hydrogen atom, a carbon atom, a nitrogen atom, an oxygen atom, a phosphor atom, a sulfur atom, or a halogen atom.

Concrete examples of a more preferable ligand encompass ligands expressed by the following Chemical Formulae (74) through (116):

-continued
(93) 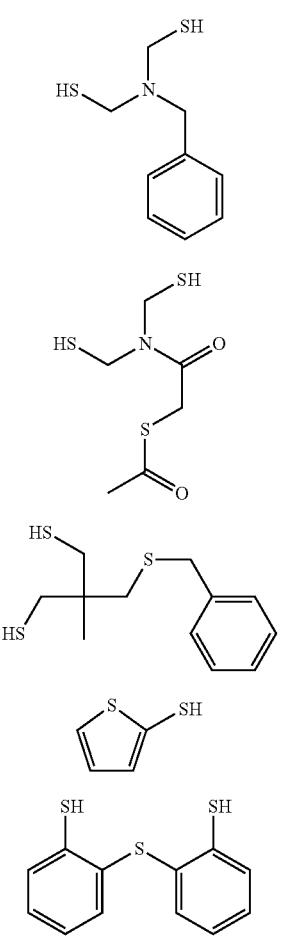
(94)
(95)
(96)
(97)
(98) 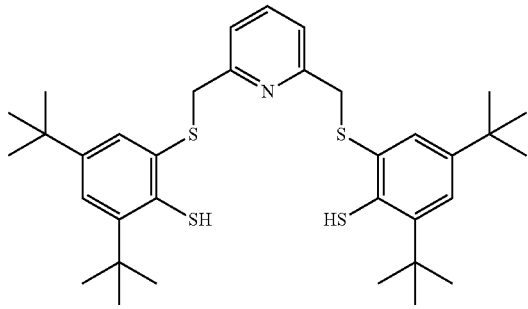
(99) 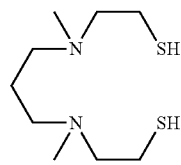
(100) 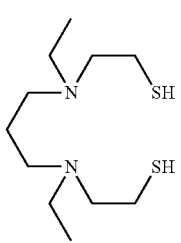
-continued
(101) 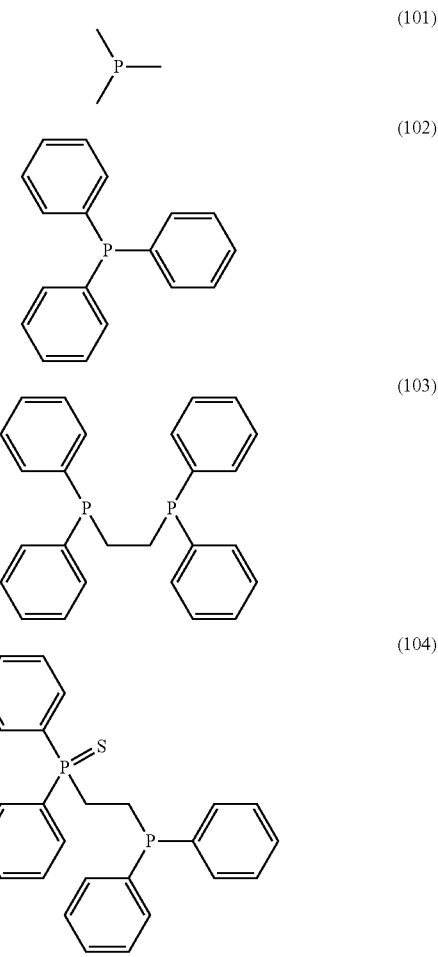
(102)
(103)
(104)
Chem. 13
(105)
(106)
(107) 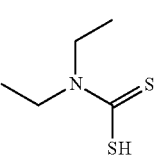
(108) 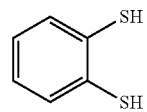

-continued

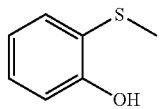
(109)

(110)

(111)

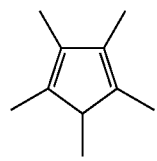
(112)

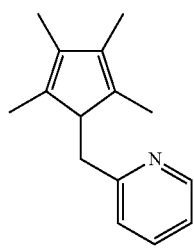
(113)

(114)

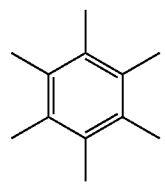
(115)

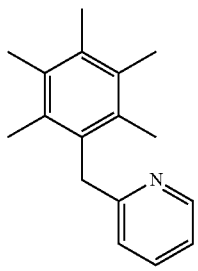
(116)

Note that each of the above ligands can coordinate to a metal through deprotonation.

In the molecular metal complexes expressed by the General Formulae (1) through (73), as $L^1$ through $L^{624}$ and $M^1$ through $M^{194}$, any combination of the above ligands and the above metal atoms or metal ions can be selected. Similarly, in the molecular metal complexes expressed by the General Formulae (5) through (21), as $L^{19}$ through $L^{130}$ and $M^5$ through $M^{38}$, any combination of the above ligands and the above metal atoms or metal ions can be selected.

The molecular metal complexes whose structures are made of such combinations would not be burned at a high temperature. With this, it is possible to prepare a fuel cell electrode catalyst maintaining a chemical structure of a metal complex.

Further, with the various combinations described above, it is possible to freely design a ligand in a complex so as to easily control the catalytic power of the complex. Furthermore, use of the above molecular metal complex makes it possible to freely design a ligand in a complex so as to ravel a mechanism of electrode reaction. This can provide a new method and technique for research and development of catalysts. Moreover, in a case where the above molecular metal complex includes an organic metal group, it is possible to easily control electronic effects by changing a substituent.

In addition, the above molecular metal complex is water-soluble and stable in water. Therefore, the above molecular metal complex is very effective in a fuel cell which uses (i) hydrogen including saturated steam, etc. and (ii) oxygen.

For the above molecular metal complex, any combination of (i) the above ligands and (ii) the above metal atoms or metal ions can be selected. For example, the above molecular metal complex can be a dinuclear metal complex in which two metal atoms or two metal ions are crosslinked by a sulfur atom. This dinuclear metal complex is, for example, a dinuclear metal complex including a sulfur atom as at least one of $L^{20}$ and $L^{21}$ in the General Formula (5), at least one of $L^{24}$ and $L^{25}$ in the General Formula (6), at least one of $L^{29}$ and $L^{30}$ in the General Formula (7), at least one of $L^{35}$ and $L^{36}$ in the General Formula (8), at least one of $L^{43}$ and $L^{44}$ in the General Formula (9), at least one of $L^{49}$ and $L^{50}$ in the General Formula (10), at least one of $L^{56}$ and $L^{57}$ in the General Formula (11), at least one of $L^{65}$ and $L^{66}$ in the General Formula (12), at least one of $L^{73}$ and $L^{74}$ in the General Formula (13), at least one of $L^{83}$ and $L^{84}$ in the General Formula (14), at least one of $L^{89}$, $L^{90}$, and $L^{91}$ in the General Formula (15), at least one of $L^{92}$, $L^{93}$, and $L^{94}$ in the General Formula (16), at least one of $L^{97}$, $L^{98}$, and $L^{99}$ in the General Formula (17), at least one of $L^{102}$, $L^{103}$, and $L^{104}$ in the General Formula (18), at least one of $L^{108}$, $L^{109}$, and $L^{110}$ in the General Formula (19), at least one of $L^{116}$, $L^{117}$, and $L^{118}$ in the General Formula (20), or at least one of $L^{125}$, $L^{126}$, and $L^{127}$ in the General Formula (21).

More concrete examples of the one or more molecular metal complexes selected from the molecular metal complexes expressed by the General Formulae (1) through (73) encompass molecular metal complexes expressed by the following Chemical Formulae (117) through (151):

Chem. 14

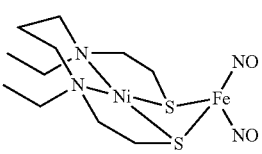
(117)

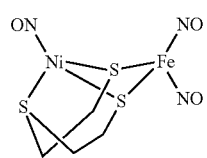
(118)

-continued
(119)
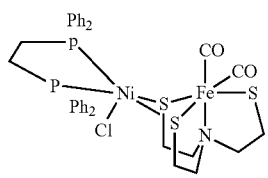
Chem. 15
(120)
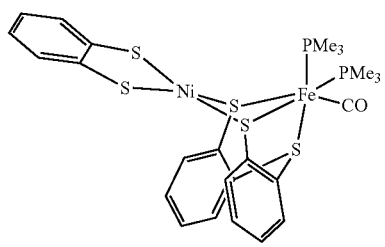
(121)
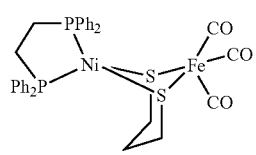
(122)
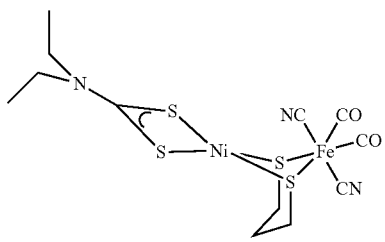
(123)
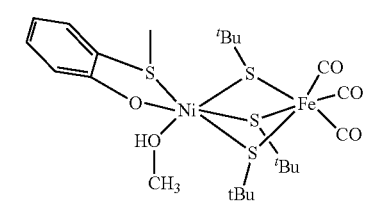
(124)
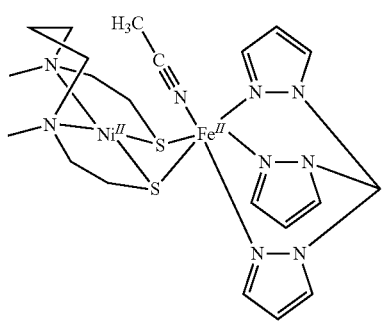
(125)
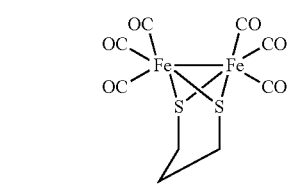
-continued
(126)
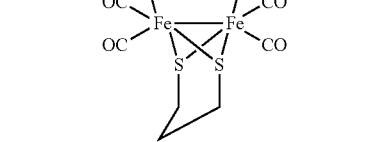
(127)
(128)
(129)
(130)
(131)

-continued
Chem. 16
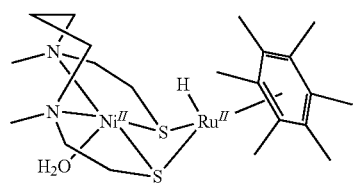
(132)
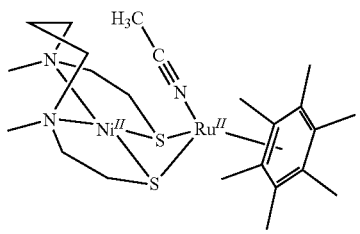
(133)
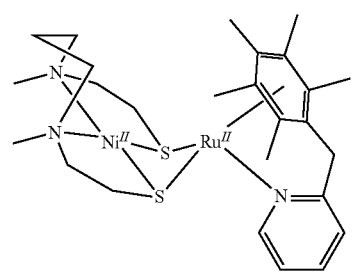
(134)
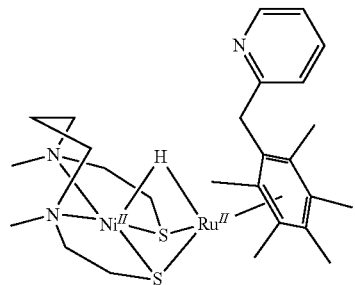
(135)
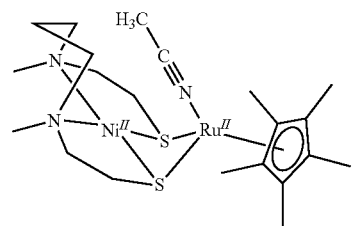
(136)
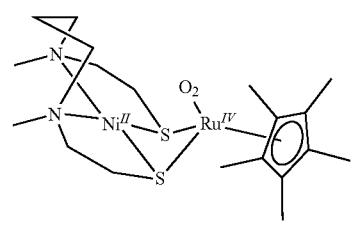
(137)
-continued
(138)
(139)
(140)
Chem. 17
(141)
(142)

(143) 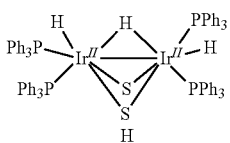

(144) 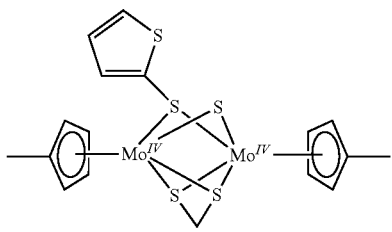

(145) 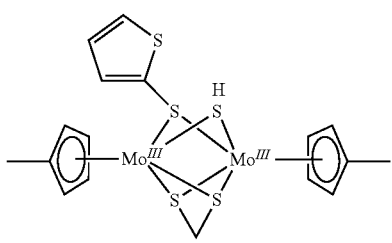

(146) 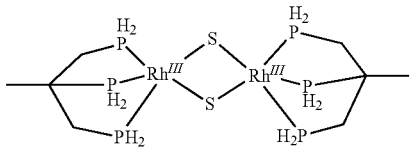

(147) 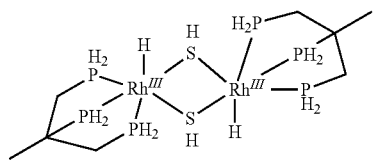

(148) 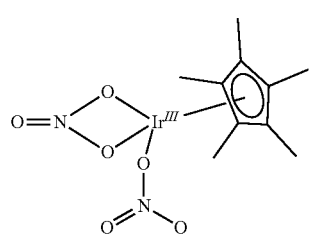

(149) 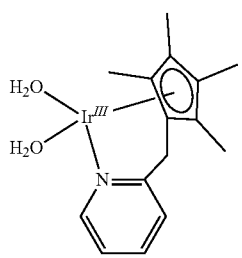

(150) 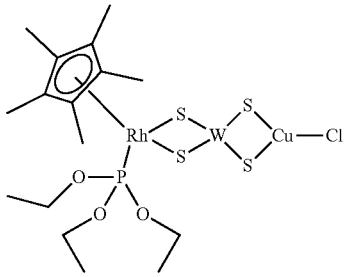

(151) 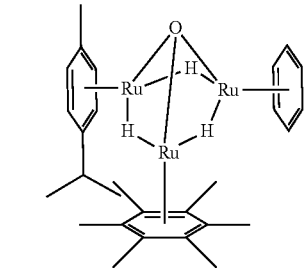

Among these, the molecular metal complexes expressed by the Chemical Formulae (131) through (138) are more preferable, because each of these molecular metal complexes exhibits high electromotive force, as indicated by the later-described Examples.

A method for producing the above molecular metal complex is not particularly limited. The method for producing the above molecular metal complex can be suitably selected from conventionally-known methods according to a ligand coordinating to the molecular metal complex, and can be a combination of such the methods. Further, the above molecular metal complex can be a commercially available molecular metal complex.

(I-2) Fuel Cell Electrode Catalyst

A fuel cell electrode catalyst of the present invention includes one or more molecular metal complexes selected from the molecular metal complexes indicated above.

The fuel cell electrode catalyst of the present invention can be suitably used in any fuel cells. In particular, the fuel cell electrode catalyst of the present invention can be more suitably used in a solid polymer fuel cell.

Typically, the solid polymer fuel cell is configured so as to include an electrolyte membrane sandwiched by an anode and a cathode. Further, electricity and thermal energy are taken from the solid polymer fuel cell through electrochemical reaction of (i) hydrogen, etc. serving as a fuel and (ii) oxygen (or the air) serving as an oxidant. In this process, oxidation reaction of the fuel occurs in the anode (also called a negative electrode or a fuel electrode), whereas reduction of the oxidant occurs in the cathode (also called a positive electrode or an air electrode). Instead of hydrogen, the fuel can be gasoline, methanol, diethyl ether, carbon hydride, or the like, each of which is reformed into hydrogen and supplied to the fuel cell. Further, the fuel cell electrode catalyst of the present invention is applicable also to a direct-type fuel cell to which methanol, diethyl ether, or the like can be directly supplied as a fuel.

The fuel cell electrode catalyst of the present invention only needs to include one or more molecular metal complexes selected from the molecular metal complexes indicated above. Namely, the fuel cell electrode catalyst of the present invention may include a single kind of molecular metal complex selected from the molecular metal complexes exemplified above. Alternatively, the fuel cell electrode catalyst of the present invention may include two or more kinds of molecular metal complexes selected from the molecular metal complexes indicated above.

Further, the fuel cell electrode catalyst of the present invention may include only the above molecular metal complex. Alternatively, if necessary, the fuel cell electrode catalyst of the present invention may include other component(s) in addition to the above molecular metal complex.

Examples of the "other component(s)" encompass: catalyst supports such as Vulcan (manufactured by Cabot Corporation), carbon black, acetylene black, furnace black, graphite, carbon nanotube, carbon nanofiber, black smoke, carbon fiber, and activated charcoal; and conductive polymers such as polyacetylene, polypyrrole, polythiol, polyimidazole, polypyridine, polyaniline, and polythiophene. In the case where the fuel cell electrode catalyst includes other component(s), a percentage of (i) other component(s) with respect to (ii) the molecular metal complex included in the fuel cell electrode catalyst is not particularly limited. However, a percentage of the catalyst support with respect to the molecular metal complex is 0 wt % or more but not more than 50 wt %, and a percentage of the conductive polymer with respect to the molecular metal complex is 0 wt % or more but not more than 50 wt %.

Further, if necessary, the fuel cell electrode catalyst of the present invention may contain a proton-conductive polymer electrolyte such as Nafion (Registered Trademark), Flemion (Registered Trademark), or Aciplex (Registered Trademark).

(I-3) Fuel Cell Electrode Catalyst Usable in Each of Anode and Cathode

The present invention is based on the following finding that the inventors of the present invention have reached for the first time: A molecular metal complex, which has been conventionally considered not to have ability as the fuel cell electrode catalyst, functions as the fuel cell electrode catalyst.

Surprisingly, in the present invention, such an unexpected effect has been found that the above molecular metal complex functions as the fuel cell electrode catalyst not only in the anode but also in the cathode.

Typically, different kinds of catalysts are used for (i) an electrode catalyst for the anode which activates hydrogen molecules and (ii) an electrode catalyst for the cathode which activates oxygen molecules. Also from this, it has not been expected that the above molecular metal complex functions as the fuel cell electrode catalyst not only in the anode but also in the cathode. Further, it has never reported that a molecular metal complex functions as the fuel cell electrode catalyst in the cathode.

However, the above molecular metal complex exhibits an ability to function as the fuel cell electrode catalyst also in the cathode. Namely, the fuel cell electrode catalyst of the present invention including the above molecular metal complex is a fuel cell electrode catalyst usable in each of the anode and the cathode, which fuel cell electrode catalyst can be used in each of the anode and the cathode of the fuel cell.

Since the above molecular metal complex can be used not only in the anode but also in the cathode, it is possible to further reduce a use amount of platinum as a simple substance or a platinum alloy and to more easily control the catalytic power.

(II) Use of Fuel Cell Electrode Catalyst of the Present Invention

A fuel cell electrode catalyst of the present invention is economical and has easy-to-control catalytic power. Therefore, the fuel cell electrode catalyst of the present invention can be suitably used in a fuel cell electrode, a fuel cell, and an electric power generation method. Namely, the scope of the present invention encompass a fuel cell electrode including the fuel cell electrode catalyst, a fuel cell including the fuel cell electrode catalyst, and an electric power generation method using the fuel cell electrode catalyst.

(II-1) Fuel Cell Electrode

A fuel cell electrode of the present invention is not particularly limited, as long as it includes the above fuel cell electrode catalyst. The fuel cell electrode of the present invention can include any of various conventionally-known structures according to a type of a fuel cell.

Taking the solid polymer fuel cell as an example, the fuel cell electrode of the present invention can be applied to a catalyst layer-attached gas diffusion layer electrode for the cathode and/or the anode. In the catalyst layer-attached gas diffusion layer electrode, a catalyst layer containing the above fuel cell electrode catalyst is laminated on a gas diffusion layer. The gas diffusion layer is made of porous carbon or the like such as carbon cloth or carbon paper, and is configured to diffuse a fuel or oxygen (the air) supplied via a gas flow path so that the fuel or oxygen (the air) is efficiently supplied to the catalyst.

The catalyst layer provided on the gas diffusion layer is produced, e.g., in such a manner that the above fuel cell electrode catalyst is applied onto the gas diffusion layer in the form of a solution, a suspension, slurry, paste, or the like and is then dried. There is no particular limitation on a medium for making the above fuel cell electrode catalyst into the form of the solution, suspension, slurry, paste, or the like. Such the medium may be suitably selected from conventionally-known media.

Note that, if necessary, the catalyst layer may contain the above catalyst support, conductive polymer, ionomer, and/or the like, in addition to the above fuel cell electrode catalyst. The catalyst support, conductive polymer, ionomer, and/or the like may be added to the solution, suspension, slurry, paste, or the like of the above fuel cell electrode catalyst. Alternatively, the catalyst support, conductive polymer, ionomer, and/or the like may be applied in the form of a solution, a suspension, slurry, paste, or the like before/after or at the same time with the application of the catalyst layer, independently of the solution, suspension, slurry, paste, or the like of the above fuel cell electrode catalyst.

(II-2) Fuel Cell

A configuration of a fuel cell of the present invention is not particularly limited, as long as it is employed in a generally-used fuel cell. For example, the fuel cell of the present invention is configured to include at least an electrolyte membrane, an anode, and a cathode, the electrolyte membrane being sandwiched by the anode and the cathode.

Such the fuel cell can be produced, for example, as follows. In the above-described manner, (i) a catalyst layer-attached gas diffusion layer electrode for the cathode and (ii) a catalyst layer-attached gas diffusion layer electrode for the anode are produced. Between the catalyst layer-attached gas diffusion layer electrodes thus produced, an electrolyte membrane is provided so that catalyst layers of the respective catalyst layer-attached gas diffusion layer electrodes face each other via the electrolyte membrane. Consequently, a membrane electrode assembly (MEA) is obtained. The membrane electrode assembly thus obtained can be incorporated into a fuel cell for use.

The fuel cell of the present invention only needs to include the above fuel cell electrode catalyst(s) independently for the anode and/or the cathode. Namely, the fuel cell electrodes of the present invention may be used in both of the anode and the cathode. Alternatively, the fuel cell electrode of the present invention may be used in either one of the anode and the cathode. In the case where the fuel cell electrode of the present invention is used in either one of the anode and the cathode, an opposing electrode catalyst may be any of conventionally-known catalysts, for example, a catalyst containing platinum as a simple substance, a platinum alloy, or the like.

The electrolyte membrane is not particularly limited, as long as it is a polymer membrane having high hydrogen ion conductivity. The electrolyte membrane can be any of generally-used electrolyte membranes such as perfluorosulfonic acid proton exchanging membranes, examples of which encompass Nafion (Registered Trademark), Flemion (Registered Trademark), and Aciplex (Registered Trademark).

(II-3) Electric Power Generation Method

An electric power generation method of the present invention only needs to include the step(s) of: oxidizing a fuel through use of the above fuel cell electrode catalyst; and/or reducing an oxidant through use of the above fuel cell electrode catalyst. Namely, the electric power generation method of the present invention may include both of or either one of the steps of: oxidizing a fuel through use of the above fuel cell electrode catalyst; and reducing an oxidant through use of the above fuel cell electrode catalyst.

To be more specific, for example, the electric power generation method of the present invention includes the step(s) of: causing, through use of the above fuel cell electrode catalyst, a hydrogen molecule to release an electron so that the hydrogen molecule is turned into a hydrogen ion; and/or causing, through use of the above fuel cell electrode catalyst, the hydrogen ion, the electron, and an oxygen molecule to react each other so that water is generated.

The electric power generation method of the present invention is not particularly limited, and may be carried out by any of generally-known processes. For example, hydrogen gas is supplied to the anode of the fuel cell, whereas oxygen is supplied to the cathode of the fuel cell. In this process, the hydrogen gas and oxygen may be moistured through a bubbler.

When the hydrogen gas is supplied to the anode, hydrogen molecules in the hydrogen gas release electrons in response to an effect of the above fuel cell electrode catalyst, so that the hydrogen molecules are turned into hydrogen ions. The hydrogen ions pass through an electrolyte membrane so as to move to the cathode, which faces the anode. In the cathode, (i) the hydrogen ions thus moved to and (ii) oxygen molecules supplied to the cathode react with each other in response to an effect of the above fuel cell electrode catalyst, so that water is generated. In this process, a flow of the electrons in an electric cable is taken as direct-current electricity.

The present invention can be expressed also as follows:

The fuel cell electrode catalyst of the present invention may preferably be arranged such that the one or more molecular metal complexes include, as the above molecular metal complex, one or more molecular metal complexes selected from molecular metal complexes expressed by General Formulae (1) through (73) above, where each of $L^1$ through $L^{624}$ independently indicates a ligand, each of $M^1$ through $M^{194}$ independently indicates a metal atom or a metal ion, and the molecular metal complex expressed by the General Formula (2) is a metal complex other than a porphyrin derivative.

The fuel cell electrode catalyst of the present invention may preferably be arranged such that the one or more molecular metal complexes selected from the molecular metal complexes expressed by the General Formulae (1) through (73) include one or more molecular metal complexes selected from the molecular metal complexes expressed by the General Formulae (5) through (21).

The fuel cell electrode catalyst of the present invention may preferably be arranged such that the fuel cell electrode catalyst is usable in each of an anode and a cathode.

The fuel cell electrode catalyst of the present invention may preferably be arranged such that the one metal atom or one metal ion is a metal atom or a metal ion thereof, the metal atom being selected from the group consisting of metal atoms and metal ions of 3A group elements, 4A group elements, 5A group elements, 6A group elements, 7A group elements, 8 group elements, 1B group elements, 3B group elements, and 6B group elements in a periodic table.

The fuel cell electrode catalyst of the present invention may preferably be arranged such that the one metal atom or one metal ion is a metal atom or a metal ion thereof, the metal atom being selected from the group consisting of the metal atoms and the metal ions of the 8 group elements.

The fuel cell electrode catalyst of the present invention may preferably be arranged such that each of ligand atoms of the ligands indicated by $L^1$ through $L^{624}$ is independently a hydrogen atom, a carbon atom, a nitrogen atom, an oxygen atom, a phosphor atom, a sulfur atom, or a halogen atom.

The fuel cell electrode catalyst of the present invention may preferably be arranged such that each of the ligands indicated by $L^1$ through $L^{624}$ is independently selected from ligands expressed by the above Chemical Formulae (74) through (11.6).

The fuel cell electrode catalyst of the present invention may preferably be arranged such that the one or more molecular metal complexes selected from the molecular metal complexes expressed by the General Formulae (1) through (73) are selected from molecular metal complexes expressed by the above Chemical Formulae (117) through (151).

The fuel cell electrode catalyst of the present invention may preferably be arranged such that the one or more molecular metal complexes selected from the molecular metal complexes expressed by the Chemical Formulae (117) through (151) are selected from the molecular metal complexes expressed by the Chemical Formulae (131) through (138).

A fuel cell electrode of the present invention includes a fuel cell electrode catalyst of the present invention.

A fuel cell of the present invention includes a fuel cell electrode catalyst of the present invention independently for each of an anode and/or a cathode.

An electric power generation method of the present invention includes the steps of: oxidizing a fuel through use of a fuel cell electrode catalyst of the present invention; and/or reducing an oxidant through use of a fuel cell electrode catalyst of the present invention.

EXAMPLES

Example 1

<Production of Carbon Cloth to which Fuel Cell Electrode Catalyst of the Present Invention is Applied>

10 mg of the molecular metal complex expressed by the Chemical Formula (117) was evenly applied onto a carbon cloth (manufactured by E-TEK) of 5 cm$^2$. Specifically, the molecular metal complex was dispersed in 100 mg of a Nafion (Registered Trademark) solution, and a dispersion solution thus obtained was applied to the carbon cloth. Then, the resultant was dried at 25° C. under reduced pressure.

Note that the molecular metal complex expressed by the Chemical Formula (117) was synthesized with reference to F. Osterloh, W. Saak, D. Haase and S. Pohl, Chem. Commun., 1997, 979-980.

Example 1-1: Production of Fuel Cell Including, in Anode, Fuel Cell Electrode Catalyst of the Present Invention A membrane electrode assembly (MEA) was produced by (i) providing, on the hydrogen electrode (anode) side, a carbon cloth to which the molecular metal complex was applied and (ii) providing, on the oxygen electrode (cathode) side, a carbon cloth to which platinum carbon TEC10V50E (manufactured by Takana Kikinzoku Kogyo K.K.) was applied so that a polymer membrane (Nafion (Registered Trademark) NRE212, manufactured by DuPont) was sandwiched by these carbon cloths. The membrane electrode assembly thus obtained was incorporated into a fuel cell (manufactured by Toyo Corporation). In this manner, a fuel cell was produced. In the above process, the polymer membrane was sandwiched by the carbon cloths so that (i) a side of one of the carbon clothes to which side the molecular metal complex was applied and (ii) a side of the other of the carbon cloths to which side platinum was applied face each other via the polymer membrane. Hydrogen and oxygen were supplied to the fuel cell thus produced, and an electromotive force of the fuel cell was measured. The result of the measurement is shown in Table 1.

Note that the fuel cell thus produced was configured such that each of the hydrogen electrode (anode) and the oxygen electrode (cathode) contains Vulcan (manufactured by Cabot Corporation) and Nafion (Registered Trademark) functioning as an ionomer. Specifically, 10 mg of the molecular metal complex and 60 mg of Vulcan were added to 100 mg of a Nafion (Registered Trademark) solution (Nafion perfluorinated ion-exchange resin, 5 wt % soln in lower aliphatic alcohols/$H_2O$ mix (product name), manufactured by Aldrich), and the mixture was dispersed by an ultrasonic vibration machine. Then, the resultant solution was applied to a carbon cloth. In a similar way, platinum carbon was applied to a carbon cloth.

Example 1-2: Production of Fuel Cell Including, in Cathode, Fuel Cell Electrode Catalyst of the Present Invention A membrane electrode assembly (MEA) was produced by (i) providing, on the hydrogen electrode side, a carbon cloth to which platinum carbon TEC10V50E (manufactured by Takana Kikinzoku Kogyo K.K.) was applied and (ii) providing, on the oxygen electrode side, a carbon cloth to which the molecular metal complex was applied so that a polymer membrane (Nafion (Registered Trademark) NRE212, manufactured by DuPont) was sandwiched by these carbon cloths. The membrane electrode assembly thus obtained was incorporated into a fuel cell (manufactured by Toyo Corporation). In this manner, a fuel cell was produced. In the above process, the polymer membrane was sandwiched by the carbon cloths so that (i) a side of one of the carbon cloths to which side the molecular metal complex was applied and (ii) a side of the other of the carbon cloths to which side platinum was applied face each other via the polymer membrane. Hydrogen and oxygen were supplied to the fuel cell thus produced, and an electromotive force of the fuel cell was measured. The result of the measurement is shown in Table 1.

Note that the fuel cell thus produced was configured such that each of the hydrogen electrode (anode) and the oxygen electrode (cathode) contains Vulcan (manufactured by Cabot Corporation) and Nafion (Registered Trademark) functioning as an ionomer. Specifically, 10 mg of the molecular metal complex and 60 mg of Vulcan were added to 100 mg of a Nafion (Registered Trademark) solution (Nafion perfluorinated ion-exchange resin, 5 wt % soln in lower aliphatic alcohols/$H_2O$ mix (product name), manufactured by Aldrich), and the mixture was dispersed by the ultrasonic vibration machine. Then, the resultant solution was applied to a carbon cloth. In a similar way, platinum carbon was applied to a carbon cloth. Further, the hydrogen electrode includes, as a conductive polymer, polypyrrole which was caused to be supported by Vulcan with reference to Non-Patent Literature 2.

Example 1-3: Production of Fuel Cell Including, in Anode and Cathode, Fuel Cell Electrode Catalysts of the Present Invention A membrane electrode assembly (MEA) was produced by providing, on both of the hydrogen electrode side and the oxygen electrode side, carbon cloths to each of which the molecular metal complex was applied so that a polymer membrane (Nafion (Registered Trademark) NRE212, manufactured by DuPont) was sandwiched by these carbon cloths. The membrane electrode assembly thus obtained was incorporated into a fuel cell (manufactured by Toyo Corporation). In this manner, a fuel cell was produced. In the above process, the polymer membrane was sandwiched by the carbon cloths so that sides of the respective carbon cloths to each of which sides the molecular metal complex was applied face each other via the polymer membrane. Hydrogen and oxygen were supplied to the fuel cell thus produced, and an electromotive force of the fuel cell was measured. The result of the measurement is shown in Table 1.

Note that the fuel cell thus produced was configured such that each of the hydrogen electrode (anode) and the oxygen electrode (cathode) contains Vulcan (manufactured by Cabot Corporation) and Nafion (Registered Trademark) functioning as an ionomer. Specifically, 10 mg of the molecular metal complex and 60 mg of Vulcan were added to 100 mg of a Nafion (Registered Trademark) solution (Naftion perfluorinated ion-exchange resin, 5 wt % soln in lower aliphatic alcohols/$H_2O$ mix (product name), manufactured by Aldrich), and the mixture was dispersed by the ultrasonic vibration machine. Then, the resultant solution was applied to a carbon cloth. Note that the hydrogen electrode includes, as a conductive polymer, polypyrrole which was caused to be supported by Vulcan with reference to Non-Patent Literature 2.

Example 2

In the same manner as in Example 1 except that the molecular metal complex expressed by the Chemical Formula (118) was used instead of the molecular metal complex expressed by the Chemical Formula (117), a fuel cell (Example 2-4) including, in the anode, the fuel cell electrode catalyst of the present invention, a fuel cell (Example 2-5) including, in the cathode, the fuel cell electrode catalyst of the present invention, and a fuel cell (Example 2-6) including, in the anode and the cathode, the fuel cell electrode catalysts of the present invention were produced. Further, performance of these fuel cells was evaluated. The results of the evaluations are shown in Table 1.

Note that the molecular metal complex expressed by the Chemical Formula (118) was synthesized with reference to W.-F. Liaw, C.-Y. Chiang, G.-H. Lee, S.-M. Peng, C.-H. Lai and M. Y. Darensbourg, Inorg. Chem., 2000, 39, 480-484.

Example 3

In the same manner as in Example 1 except that the molecular metal complex expressed by the Chemical Formula (119) was used instead of the molecular metal complex expressed by the Chemical Formula (117), a fuel cell (Example 3-7) including, in the anode, the fuel cell electrode catalyst of the present invention, a fuel cell (Example 3-8) including, in the cathode, the fuel cell electrode catalyst of the present invention, and a fuel cell (Example 3-9) including, in the anode and the cathode, the fuel cell electrode catalysts of the present invention were produced. Further, performance of these fuel cells was evaluated. The results of the evaluations are shown in Table 1.

Note that the molecular metal complex expressed by the Chemical Formula (119) was synthesized with reference to S. C. Davies, D. J. Evans, D. L. Hughes, S. Longhurst and J. R. Sanders, Chem. Commun., 1999, 1935-1936.

Example 4

In the same manner as in Example 1 except that the molecular metal complex expressed by the Chemical Formula (120) was used instead of the molecular metal complex expressed by the Chemical Formula (117), a fuel cell (Example 4-10) including, in the anode, the fuel cell electrode catalyst of the present invention, a fuel cell (Example 4-11) including, in the cathode, the fuel cell electrode catalyst of the present invention, and a fuel cell (Example 4-12) including, in the anode and the cathode, the fuel cell electrode catalysts of the present invention were produced. Further, performance of these fuel cells was evaluated. The results of the evaluations are shown in Table 1.

Note that the molecular metal complex expressed by the Chemical Formula (120) was synthesized with reference to D. Sellmann, F. Geipel, F. Lauderbach and F. W. Heinemann, Angew. Chem., Int. Ed., 2002, 41, 632-634.

TABLE 1

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 1-1 | Yes | Yes | No | Chemical Formula (117) | Nafion | Nafion NRE212 | Nafion | Pt | No | Yes | Yes | 0.3 | 0.001 |
| 1-2 | Yes | Yes | Yes | Pt | Nafion | Nafion NRE212 | Nafion | Chemical Formula (117) | No | Yes | Yes | 0.35 | 0.001 |
| 1-3 | Yes | Yes | Yes | Chemical Formula (117) | Nafion | Nafion NRE212 | Nafion | Chemical Formula (117) | No | Yes | Yes | 0.1 | 0.001 |
| 2-4 | Yes | Yes | No | Chemical Formula (118) | Nafion | Nafion NRE212 | Nafion | Pt | No | Yes | Yes | 0.4 | 0.001 |
| 2-5 | Yes | Yes | Yes | Pt | Nafion | Nafion NRE212 | Nafion | Chemical Formula (118) | No | Yes | Yes | 0.4 | 0.001 |
| 2-6 | Yes | Yes | Yes | Chemical Formula (118) | Nafion | Nafion NRE212 | Nafion | Chemical Formula (118) | No | Yes | Yes | 0.15 | 0.001 |
| 3-7 | Yes | Yes | No | Chemical Formula (119) | Nafion | Nafion NRE212 | Nafion | Pt | No | Yes | Yes | 0.3 | 0.001 |
| 3-8 | Yes | Yes | Yes | Pt | Nafion | Nafion NRE212 | Nafion | Chemical Formula (119) | No | Yes | Yes | 0.3 | 0.001 |
| 3-9 | Yes | Yes | Yes | Chemical Formula (119) | Nafion | Nafion NRE212 | Nafion | Chemical Formula (119) | No | Yes | Yes | 0.2 | 0.001 |
| 4-10 | Yes | Yes | No | Chemical Formula (120) | Nafion | Nafion NRE212 | Nafion | Pt | No | Yes | Yes | 0.2 | 0.001 |
| 4-11 | Yes | Yes | Yes | Pt | Nafion | Nafion NRE212 | Nafion | Chemical Formula (120) | No | Yes | Yes | 0.1 | 0.001 |
| 4-12 | Yes | Yes | Yes | Chemical Formula (120) | Nafion | Nafion NRE212 | Nafion | Chemical Formula (120) | No | Yes | Yes | 0.05 | 0.001 |

Example 5

In the same manner as in Example 1 except that the molecular metal complex expressed by the Chemical Formula (121) was used instead of the molecular metal complex expressed by the Chemical Formula (117), a fuel cell (Example 5-13) including, in the anode, the fuel cell electrode catalyst of the present invention, a fuel cell (Example 5-14) including, in the cathode, the fuel cell electrode catalyst of the present invention, and a fuel cell (Example 5-15) including, in the anode and the cathode, the fuel cell electrode catalysts of the present invention were produced. Further, performance of these fuel cells was evaluated. The results of the evaluations are shown in Table 2.

Note that the molecular metal complex expressed by the Chemical Formula (121) was synthesized with reference to W. Zhu, A. C. Marr, Q. Wang, F. Neese, D. J. E. Spencer, A. J. Blake, P. A. Cooke, C. Wilson and M. Schroder, Proc. Natl. Acad. Sci. U.S.A, 2005, 102, 18280-18285.

Example 6

In the same manner as in Example 1 except that the molecular metal complex expressed by the Chemical Formula (122) was used instead of the molecular metal complex expressed by the Chemical Formula (117), a fuel cell (Example 6-16) including, in the anode, the fuel cell electrode catalyst of the present invention, a fuel cell (Example 6-17) including, in the cathode, the fuel cell electrode catalyst of the present invention, and a fuel cell (Example 6-18) including, in the anode and the cathode, the fuel cell electrode catalysts of the present invention were produced. Further, performance of these fuel cells was evaluated. The results of the evaluations are shown in Table 2.

Note that the molecular metal complex expressed by the Chemical Formula (122) was synthesized with reference to Z. Li, Y. Ohki and K. Tatsuni, J. Am. Chem. Soc., 2005, 127, 8950-8951.

Example 7

In the same manner as in Example 1 except that the molecular metal complex expressed by the Chemical Formula (123) was used instead of the molecular metal complex expressed by the Chemical Formula (117), a fuel cell (Example 7-19) including, in the anode, the fuel cell electrode catalyst of the present invention, a fuel cell (Example 1-20) including, in the cathode, the fuel cell electrode catalyst of the present invention, and a fuel cell (Example 1-21) including, in the anode and the cathode, the fuel cell electrode catalysts of the present invention were produced. Further, performance of these fuel cells was evaluated. The results of the evaluations are shown in Table 2.

Note that the molecular metal complex expressed by the Chemical Formula (123) was synthesized with reference to Y. Ohki, K. Yasumura, K. Kuge, S. Tanino, M. Ando, Z. Li and K. Tatsumi, Proc. Natl. Acad. Sci. U.S.A, 2008, 105, 7652-7657.

Example 8

In the same manner as in Example 1 except that the molecular metal complex expressed by the Chemical Formula (124) was used instead of the molecular metal complex expressed by the Chemical Formula (117), a fuel cell (Example 8-22) including, in the anode, the fuel cell electrode catalyst of the present invention, a fuel cell (Example 8-23) including, in the cathode, the fuel cell electrode catalyst of the present invention, and a fuel cell (Example 8-24) including, in the anode and the cathode, the fuel cell electrode catalysts of the present invention were produced. Further, performance of these fuel cells was evaluated. The results of the evaluations are shown in Table 2.

Note that the molecular metal complex expressed by the Chemical Formula (124) was synthesized with reference to K. Ichikawa, T. Matsumoto and S. Ogo, Dalton Trans., 2009, 4304-4309.

TABLE 2

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A $cm^{-2}$ |
|---|---|---|---|---|---|---|---|---|---|---|---|---|---|
| 5-13 | Yes | Yes | No | Chemical Formula (121) | Nafion | Nafion NRE212 | Nafion | Pt | No | Yes | Yes | 0.35 | 0.001 |
| 5-14 | Yes | Yes | Yes | Pt | Nafion | Nafion NRE212 | Nafion | Chemical Formula (121) | No | Yes | Yes | 0.3 | 0.001 |
| 5-15 | Yes | Yes | Yes | Chemical Formula (121) | Nafion | Nafion NRE212 | Nafion | Chemical Formula (121) | No | Yes | Yes | 0.15 | 0.001 |
| 6-16 | Yes | Yes | No | Chemical Formula (122) | Nafion | Nafion NRE212 | Nafion | Pt | No | Yes | Yes | 0.3 | 0.001 |
| 6-17 | Yes | Yes | Yes | Pt | Nafion | Nafion NRE212 | Nafion | Chemical Formula (122) | No | Yes | Yes | 0.3 | 0.001 |
| 6-18 | Yes | Yes | Yes | Chemical Formula (121) | Nafion | Nafion NRE212 | Nafion | Chemical Formula (122) | No | Yes | Yes | 0.1 | 0.001 |
| 7-19 | Yes | Yes | No | Chemical Formula (123) | Nafion | Nafion NRE212 | Nafion | Pt | No | Yes | Yes | 0.4 | 0.001 |
| 7-20 | Yes | Yes | Yes | Pt | Nafion | Nafion NRE212 | Nafion | Chemical Formula (123) | No | Yes | Yes | 0.35 | 0.001 |
| 7-21 | Yes | Yes | Yes | Chemical Formula (123) | Nafion | Nafion NRE212 | Nafion | Chemical Formula (123) | No | Yes | Yes | 0.25 | 0.001 |
| 8-22 | Yes | Yes | No | Chemical Formula (124) | Nafion | Nafion NRE212 | Nafion | Pt | No | Yes | Yes | 0.2 | 0.001 |
| 8-23 | Yes | Yes | Yes | Pt | Nafion | Nafion NRE212 | Nafion | Chemical Formula (124) | No | Yes | Yes | 0.33 | 0.001 |

TABLE 2-continued

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 8-24 | Yes | Yes | Yes | Chemical Formula (124) | Nafion | Nafion NRE212 | Nafion | Chemical Formula (124) | No | Yes | Yes | 0.12 | 0.001 |

Example 9

In the same manner as in Example 1 except that the molecular metal complex expressed by the Chemical Formula (125) was used instead of the molecular metal complex expressed by the Chemical Formula (117), a fuel cell (Example 9-25) including, in the anode, the fuel cell electrode catalyst of the present invention, a fuel cell (Example 9-26) including, in the cathode, the fuel cell electrode catalyst of the present invention, and a fuel cell (Example 9-27) including, in the anode and the cathode, the fuel cell electrode catalysts of the present invention were produced. Further, performance of these fuel cells was evaluated. The results of the evaluations are shown in Table 3.

Note that the molecular metal complex expressed by the Chemical Formula (125) was synthesized with reference to E. J. Lyon, I. P. Georgakaki, J. H. Reibenspies and M. Y. Darensbourg, Angew. Chem., Int. Ed., 1999, 38, 3178-3180.

Example 10

In the same manner as in Example 1 except that the molecular metal complex expressed by the Chemical Formula (126) was used instead of the molecular metal complex expressed by the Chemical Formula (117), a fuel cell (Example 10-28) including, in the anode, the fuel cell electrode catalyst of the present invention, a fuel cell (Example 10-29) including, in the cathode, the fuel cell electrode catalyst of the present invention, and a fuel cell (Example 10-30) including, in the anode and the cathode, the fuel cell electrode catalysts of the present invention were produced. Further, performance of these fuel cells was evaluated. The results of the evaluations are shown in Table 3.

Note that the molecular metal complex expressed by the Chemical Formula (126) was synthesized with reference to M. Schmidt, S. M. Contakes and T. B. Rauchfuss, J. Am. Chem. Soc., 1999, 121, 9736-9737.

Example 11

In the same manner as in Example 1 except that the molecular metal complex expressed by the Chemical Formula (127) was used instead of the molecular metal complex expressed by the Chemical Formula (117), a fuel cell (Example 11-31) including, in the anode, the fuel cell electrode catalyst of the present invention, a fuel cell (Example 11-32) including, in the cathode, the fuel cell electrode catalyst of the present invention, and a fuel cell (Example 11-33) including, in the anode and the cathode, the fuel cell electrode catalysts of the present invention were produced. Further, performance of these fuel cells was evaluated. The results of the evaluations are shown in Table 3.

Note that the molecular metal complex expressed by the Chemical Formula (127) was synthesized with reference to M. Razavet, S. C. Davies, D. L. Hughes and C. J. Pickett, Chem. Commun., 2001, 847-848.

Example 12

In the same manner as in Example 1 except that the molecular metal complex expressed by the Chemical Formula (128) was used instead of the molecular metal complex expressed by the Chemical Formula (117), a fuel cell (Example 12-34) including, in the anode, the fuel cell electrode catalyst of the present invention, a fuel cell (Example 12-35) including, in the cathode, the fuel cell electrode catalyst of the present invention, and a fuel cell (Example 12-36) including, in the anode and the cathode, the fuel cell electrode catalysts of the present invention were produced. Further, performance of these fuel cells was evaluated. The results of the evaluations are shown in Table 3.

Note that the molecular metal complex expressed by the Chemical Formula (128) was synthesized with reference to S. Ott, M. Kritikos, B. Akermark, L. Sun and R. Lomoth, Angew. Chem., Int. Ed., 2004, 43, 1006-1009.

TABLE 3

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 9-25 | Yes | Yes | No | Chemical Formula (125) | Nafion | Nafion NRE212 | Nafion | Pt | No | Yes | Yes | 0.36 | 0.001 |
| 9-26 | Yes | Yes | Yes | Pt | Nafion | Nafion NRE212 | Nafion | Chemical Formula (125) | No | Yes | Yes | 0.25 | 0.001 |
| 9-27 | Yes | Yes | Yes | Chemical Formula (125) | Nafion | Nafion NRE212 | Nafion | Chemical Formula (125) | No | Yes | Yes | 0.17 | 0.001 |
| 10-28 | Yes | Yes | No | Chemical Formula (126) | Nafion | Nafion NRE212 | Nafion | Pt | No | Yes | Yes | 0.37 | 0.001 |
| 10-29 | Yes | Yes | Yes | Pt | Nafion | Nafion NRE212 | Nafion | Chemical Formula (126) | No | Yes | Yes | 0.37 | 0.001 |

TABLE 3-continued

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 10 - 30 | Yes | Yes | Yes | Chemical Formula (126) | Nafion | Nafion NRE212 | Nafion | Chemical Formula (126) | No | Yes | Yes | 0.21 | 0.001 |
| 11 - 31 | Yes | Yes | No | Chemical Formula (127) | Nafion | Nafion NRE212 | Nafion | Pt | No | Yes | Yes | 0.35 | 0.001 |
| 11 - 32 | Yes | Yes | Yes | Pt | Nafion | Nafion NRE212 | Nafion | Chemical Formula (127) | No | Yea | Yes | 0.21 | 0.001 |
| 11 - 33 | Yes | Yes | Yes | Chemical Formula (127) | Nafion | Nafion NRE212 | Nafion | Chemical Formula (127) | No | Yes | Yes | 0.1 | 0.001 |
| 12 - 34 | Yes | Yes | No | Chemical Formula (128) | Nafion | Nafion NRE212 | Nafion | Pt | No | Yes | Yes | 0.33 | 0.001 |
| 12 - 35 | Yes | Yes | Yes | Pt | Nafion | Nafion NRE212 | Nafion | Chemical Formula (128) | No | Yes | Yes | 0.35 | 0.001 |
| 12 - 36 | Yes | Yes | Yes | Chemical Formula (128) | Nafion | Nafion NRE212 | Nafion | Chemical Formula (128) | No | Yes | Yes | 0.16 | 0.001 |

Example 13

In the same manner as in Example 1 except that the molecular metal complex expressed by the Chemical Formula (129) was used instead of the molecular metal complex expressed by the Chemical Formula (117), a fuel cell (Example 13-37) including, in the anode, the fuel cell electrode catalyst of the present invention, a fuel cell (Example 13-38) including, in the cathode, the fuel cell electrode catalyst of the present invention, and a fuel cell (Example 13-39) including, in the anode and the cathode, the fuel cell electrode catalysts of the present invention were produced. Further, performance of these fuel cells was evaluated. The results of the evaluations are shown in Table 4.

Note that the molecular metal complex expressed by the Chemical Formula (129) was synthesized with reference to W. Gao, J. Ekstrm, J. Liu, C. Chen, L. Eriksson, L. Weng, B. Akermark and L. Sun, Inorg. Chem., 2007, 46, 1981-1991.

Example 14

In the same manner as in Example 1 except that the molecular metal complex expressed by the Chemical Formula (130) was used instead of the molecular metal complex expressed by the Chemical Formula (117), a fuel cell (Example 14-40) including, in the anode, the fuel cell electrode catalyst of the present invention, a fuel cell (Example 14-41) including, in the cathode, the fuel cell electrode catalyst of the present invention, and a fuel cell (Example 14-42) including, in the anode and the cathode, the fuel cell electrode catalysts of the present invention were produced. Further, performance of these fuel cells was evaluated. The results of the evaluations are shown in Table 4.

Note that the molecular metal complex expressed by the Chemical Formula (130) was synthesized with reference to L.-C. Song, L.-X. Wang, B.-S. Yin, Y.-L. Li, X.-G. Zhang, Y.-W. Zhang, X. Luo and Q.-M. Hu, Eur. J. Inorg. Chem., 2008, 291-297.

Example 15

In the same manner as in Example 1 except that the molecular metal complex expressed by the Chemical Formula (131) was used instead of the molecular metal complex expressed by the Chemical Formula (117), a fuel cell (Example 15-43) including, in the anode, the fuel cell electrode catalyst of the present invention, a fuel cell (Example 15-44) including, in the cathode, the fuel cell electrode catalyst of the present invention, and a fuel cell (Example 15-45) including, in the anode and the cathode, the fuel cell electrode catalysts of the present invention were produced. Further, performance of these fuel cells was evaluated. The results of the evaluations are shown in Table 4.

Note that the molecular metal complex expressed by the Chemical Formula (131) was synthesized with reference to S. Ogo, R. Kabe, K. Uehara, B. Kure, T. Nishimura, S. C. Menon, R. Harada, S. Fukuzumi, Y. Higuchi, T. Ohhara, T. Tamada and R. Kuroki, Science, 2007, 316, 585-587.

Example 16

In the same manner as in Example 1 except that the molecular metal complex expressed by the Chemical Formula (132) was used instead of the molecular metal complex expressed by the Chemical Formula (117), a fuel cell (Example 16-46) including, in the anode, the fuel cell electrode catalyst of the present invention, a fuel cell (Example 16-47) including, in the cathode, the fuel cell electrode catalyst of the present invention, and a fuel cell (Example 16-48) including, in the anode and the cathode, the fuel cell electrode catalysts of the present invention were produced. Further, performance of these fuel cells was evaluated. The results of the evaluations are shown in Table 4.

Note that the molecular metal complex expressed by the Chemical Formula (132) was synthesized with reference to S. Ogo, R. Kabe, K. Uehara, B. Kure, T. Nishimura, S. C. Menon, R. Harada, S. Fukuzumi, Y. Higuchi, T. Ohhara, T. Tamada and R. Kuroki, Science, 2007, 316, 585-587.

TABLE 4

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 13-37 | Yes | Yes | No | Chemical Formula (129) | Nafion | Nafion NRE212 | Nafion | Pt | No | Yes | Yes | 0.23 | 0.001 |
| 13-38 | Yes | Yes | Yes | Pt | Nafion | Nafion NRE212 | Nafion | Chemical Formula (129) | No | Yes | Yes | 0.25 | 0.001 |
| 13-39 | Yes | Yes | Yes | Chemical Formula (129) | Nafion | Nafion NRE212 | Nafion | Chemical Formula (129) | No | Yes | Yes | 0.12 | 0.001 |
| 14-40 | Yes | Yes | No | Chemical Formula (130) | Nafion | Nafion NRE212 | Nafion | Pt | No | Yes | Yes | 0.35 | 0.001 |
| 14-41 | Yes | Yes | Yes | Pt | Nafion | Nafion NRE212 | Nafion | Chemical Formula (130) | No | Yes | Yes | 0.35 | 0.001 |
| 14-42 | Yes | Yes | Yes | Chemical Formula (130) | Nafion | Nafion NRE212 | Nafion | Chemical Formula (130) | No | Yes | Yes | 0.1 | 0.001 |
| 15-43 | Yes | Yes | No | Chemical Formula (131) | Nafion | Nafion NRE212 | Nafion | Pt | No | Yes | Yes | 0.29 | 0.001 |
| 15-44 | Yes | Yes | Yes | Pt | Nafion | Nafion NRE212 | Nafion | Chemical Formula (131) | No | Yes | Yes | 0.36 | 0.001 |
| 15-45 | Yes | Yes | Yes | Chemical Formula (131) | Nafion | Nafion NRE212 | Nafion | Chemical Formula (131) | No | Yes | Yes | 0.13 | 0.001 |
| 16-46 | Yes | Yes | No | Chemical Formula (132) | Nafion | Nafion NRE212 | Nafion | Pt | No | Yes | Yes | 0.75 | 0.0019 |
| 16-47 | Yes | Yes | Yes | Pt | Nafion | Nafion NRE212 | Nafion | Chemical Formula (132) | No | Yes | Yes | 0.6 | 0.001 |
| 16-48 | Yes | Yes | Yes | Chemical Formula (132) | Nafion | Nafion NRE212 | Nafion | Chemical Formula (132) | No | Yes | Yes | 0.4 | 0.001 |

Example 17

In the same manner as in Example 1 except that the molecular metal complex expressed by the Chemical Formula (133) was used instead of the molecular metal complex expressed by the Chemical Formula (117), a fuel cell (Example 17-49) including, in the anode, the fuel cell electrode catalyst of the present invention, a fuel cell (Example 17-50) including, in the cathode, the fuel cell electrode catalyst of the present invention, and a fuel cell (Example 17-51) including, in the anode and the cathode, the fuel cell electrode catalysts of the present invention were produced. Further, performance of these fuel cells was evaluated. The results of the evaluations are shown in Table 5.

Note that the molecular metal complex expressed by the Chemical Formula (133) was synthesized with reference to K. Ichikawa, T. Matsumoto and S. Ogo, Dalton Trans., 2009, 4304-4309.

Example 18

In the same manner as in Example 1 except that the molecular metal complex expressed by the Chemical Formula (134) was used instead of the molecular metal complex expressed by the Chemical Formula (117), a fuel cell (Example 18-52) including, in the anode, the fuel cell electrode catalyst of the present invention, a fuel cell (Example 18-53) including, in the cathode, the fuel cell electrode catalyst of the present invention, and a fuel cell (Example 18-54) including, in the anode and the cathode, the fuel cell electrode catalysts of the present invention were produced. Further, performance of these fuel cells was evaluated. The results of the evaluations are shown in Table 5.

Note that the molecular metal complex expressed by the Chemical Formula (134) was synthesized with reference to (a) S. Ogo, N. Makihara, Y. Kaneko and Y. Watanabe, Organometallics, 2001, 20, 4903-4910; (b) S. Ogo, R. Kabe, K. Uehara, B. Kure, T. Nishimura, S. C. Menon, R. Harada, S. Fukuzumi, Y. Higuchi, T. Ohhara, T. Tamada and R. Kuroki, Science, 2007, 316, 585-587.

Example 19

In the same manner as in Example 1 except that the molecular metal complex expressed by the Chemical Formula (135) was used instead of the molecular metal complex expressed by the Chemical Formula (117), a fuel cell (Example 19-55) including, in the anode, the fuel cell electrode catalyst of the present invention, a fuel cell (Example 19-56) including, in the cathode, the fuel cell electrode catalyst of the present invention, and a fuel cell (Example 19-57) including, in the anode and the cathode, the fuel cell electrode catalysts of the present invention were produced. Further, performance of these fuel cells was evaluated. The results of the evaluations are shown in Table 5.

Note that the molecular metal complex expressed by the Chemical Formula (135) was synthesized by using sodium borohydride instead of hydrogen, with reference to S. Ogo, R. Kabe, K. Uchara, B. Kure, T. Nishimura, S. C. Menon, R. Harada, S. Fukuzumi, Y. Higuchi, T. Ohhara, T. Tamada and R. Kuroki, Science, 2007, 316, 585-587.

Example 20

In the same manner as in Example 1 except that the molecular metal complex expressed by the Chemical Formula (136) was used instead of the molecular metal complex expressed by the Chemical Formula (117), a fuel cell (Example 20-58) including, in the anode, the fuel cell electrode catalyst of the present invention, a fuel cell (Example 20-59) including, in the cathode, the fuel cell electrode catalyst of the present invention, and a fuel cell (Example 20-60) including, in the anode and the cathode, the fuel cell electrode catalysts of the present invention were produced. Further, performance of these fuel cells was evaluated. The results of the evaluations are shown in Table 5.

Note that the molecular metal complex expressed by the Chemical Formula (136) was synthesized with reference to M. A. Reynolds, T. B. Rauchfuss and S. R. Wilson, Organometallics, 2003, 22, 1619-1625.

TABLE 5

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 17-49 | Yes | Yes | No | Chemical Formula (133) | Nafion | Nafion NRE212 | Nafion | Pt | No | Yes | Yes | 0.34 | 0.001 |
| 17-50 | Yes | Yes | Yes | Pt | Nafion | Nafion NRE212 | Nafion | Chemical Formula (133) | No | Yes | Yes | 0.4 | 0.001 |
| 17-51 | Yes | Yes | Yes | Chemical Formula (133) | Nafion | Nafion NRE212 | Nafion | Chemical Formula (133) | No | Yes | Yes | 0.2 | 0.001 |
| 18-52 | Yes | Yes | No | Chemical Formula (134) | Nafion | Nafion NRE212 | Nafion | Pt | No | Yes | Yes | 0.31 | 0.001 |
| 18-53 | Yes | Yes | Yes | Pt | Nafion | Nafion NRE212 | Nafion | Chemical Formula (134) | No | Yes | Yes | 0.35 | 0.001 |
| 18-54 | Yes | Yes | Yes | Chemical Formula (134) | Nafion | Nafion NRE212 | Nafion | Chemical Formula (134) | No | Yes | Yes | 0.15 | 0.001 |
| 19-55 | Yes | Yes | No | Chemical Formula (135) | Nafion | Nafion NRE212 | Nafion | Pt | No | Yes | Yes | 0.37 | 0.001 |
| 19-56 | Yes | Yes | Yes | Pt | Nafion | Nafion NRE212 | Nafion | Chemical Formula (135) | No | Yes | Yes | 0.23 | 0.001 |
| 19-57 | Yes | Yes | Yes | Chemical Formula (135) | Nafion | Nafion NRE212 | Nafion | Chemical Formula (135) | No | Yes | Yes | 0.12 | 0.001 |
| 20-58 | Yes | Yes | No | Chemical Formula (136) | Nafion | Nafion NRE212 | Nafion | Pt | No | Yes | Yes | 0.25 | 0.001 |
| 20-59 | Yes | Yes | Yes | Pt | Nafion | Nafion NRE212 | Nafion | Chemical Formula (136) | No | Yes | Yes | 0.35 | 0.001 |
| 20-60 | Yes | Yes | Yes | Chemical Formula (136) | Nafion | Nafion NRE212 | Nafion | Chemical Formula (136) | No | Yes | Yes | 0.15 | 0.001 |

Example 21

In the same manner as in Example 1 except that the molecular metal complex expressed by the Chemical Formula (137) was used instead of the molecular metal complex expressed by the Chemical Formula (117), a fuel cell (Example 21-61) including, in the anode, the fuel cell electrode catalyst of the present invention, a fuel cell (Example 21-62) including, in the cathode, the fuel cell electrode catalyst of the present invention, and a fuel cell (Example 21-63) including, in the anode and the cathode, the fuel cell electrode catalysts of the present invention were produced. Further, performance of these fuel cells was evaluated. The results of the evaluations are shown in Table 6.

Note that the molecular metal complex expressed by the Chemical Formula (137) was synthesized with reference to M. A. Reynolds, T. B. Rauchfuss and S. R. Wilson, Organometallics, 2003, 22, 1619-1625.

Example 22

In the same manner as in Example 1 except that the molecular metal complex expressed by the Chemical Formula (138) was used instead of the molecular metal complex expressed by the Chemical Formula (117), a fuel cell (Example 22-64) including, in the anode, the fuel cell electrode catalyst of the present invention, a fuel cell (Example 22-65) including, in the cathode, the fuel cell electrode catalyst of the present invention, and a fuel cell (Example 22-66) including, in the anode and the cathode, the fuel cell electrode catalysts of the present invention were produced. Further, performance of these fuel cells was evaluated. The results of the evaluations are shown in Table 6.

Note that the molecular metal complex expressed by the Chemical Formula (138) was synthesized with reference to M. A. Reynolds, T. B. Rauchfuss and S. R. Wilson, Organometallics, 2003, 22, 1619-1625.

Example 23

In the same manner as in Example 1 except that the molecular metal complex expressed by the Chemical Formula (139) was used instead of the molecular metal complex expressed by the Chemical Formula (117), a fuel cell (Example 23-67) including, in the anode, the fuel cell electrode catalyst of the present invention, a fuel cell (Example 23-68)

Note that the molecular metal complex expressed by the Chemical Formula (140) was synthesized with reference to D. Sellmann, R. Prakash, F. W. Heinemann, M. Moll and M. Klimowicz, Angew. Chem., Int. Ed., 2004, 43, 1877-1880.

TABLE 6

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 21-61 | Yes | Yes | No | Chemical Formula (137) | Nafion | Nafion NRE212 | Nafion | Pt | No | Yes | Yes | 0.27 | 0.001 |
| 21-62 | Yes | Yes | Yes | Pt | Nafion | Nafion NRE212 | Nafion | Chemical Formula (137) | No | Yes | Yes | 0.35 | 0.001 |
| 21-63 | Yes | Yes | Yes | Chemical Formula (137) | Nafion | Nafion NRE212 | Nafion | Chemical Formula (137) | No | Yes | Yes | 0.12 | 0.001 |
| 22-64 | Yes | Yes | No | Chemical Formula (138) | Nafion | Nafion NRE212 | Nafion | Pt | No | Yes | Yes | 0.33 | 0.001 |
| 22-65 | Yes | Yes | Yes | Pt | Nafion | Nafion NRE212 | Nafion | Chemical Formula (138) | No | Yes | Yes | 0.34 | 0.001 |
| 22-66 | Yes | Yes | Yes | Chemical Formula (138) | Nafion | Nafion NRE212 | Nafion | Chemical Formula (138) | No | Yes | Yes | 0.17 | 0.001 |
| 23-67 | Yes | Yes | No | Chemical Formula (139) | Nafion | Nafion NRE212 | Nafion | Pt | No | Yes | Yes | 0.36 | 0.001 |
| 23-68 | Yes | Yes | Yes | Pt | Nafion | Nafion NRE212 | Nafion | Chemical Formula (139) | No | Yes | Yes | 0.35 | 0.001 |
| 23-69 | Yes | Yes | Yes | Chemical Formula (139) | Nafion | Nafion NRE212 | Nafion | Chemical Formula (139) | No | Yes | Yes | 0.12 | 0.001 |
| 24-70 | Yes | Yes | No | Chemical Formula (140) | Nafion | Nafion NRE212 | Nafion | Pt | No | Yes | Yes | 0.32 | 0.001 |
| 24-71 | Yes | Yes | Yes | Pt | Nafion | Nafion NRE212 | Nafion | Chemical Formula (140) | No | Yes | Yes | 0.3 | 0.001 |
| 24-72 | Yes | Yes | Yes | Chemical Formula (140) | Nafion | Nafion NRE212 | Nafion | Chemical Formula (140) | No | Yes | Yes | 0.1 | 0.001 | including, in the cathode, the fuel cell electrode catalyst of the present invention, and a fuel cell (Example 23-69) including, in the anode and the cathode, the fuel cell electrode catalysts of the present invention were produced. Further, performance of these fuel cells was evaluated. The results of the evaluations are shown in Table 6.

Note that the molecular metal complex expressed by the Chemical Formula (139) was synthesized with reference to M. A. Reynolds, T. B. Rauchfuss and S. R. Wilson, Organometallics, 2003, 22, 1619-1625.

Example 24

In the same manner as in Example 1 except that the molecular metal complex expressed by the Chemical Formula (140) was used instead of the molecular metal complex expressed by the Chemical Formula (117), a fuel cell (Example 24-70) including, in the anode, the fuel cell electrode catalyst of the present invention, a fuel cell (Example 24-71) including, in the cathode, the fuel cell electrode catalyst of the present invention, and a fuel cell (Example 24-72) including, in the anode and the cathode, the fuel cell electrode catalysts of the present invention were produced. Further, performance of these fuel cells was evaluated. The results of the evaluations are shown in Table 6.

Example 25

In the same manner as in Example 1 except that the molecular metal complex expressed by the Chemical Formula (141) was used instead of the molecular metal complex expressed by the Chemical Formula (117), a fuel cell (Example 25-73) including, in the anode, the fuel cell electrode catalyst of the present invention, a fuel cell (Example 25-74) including, in the cathode, the fuel cell electrode catalyst of the present invention, and a fuel cell (Example 25-75) including, in the anode and the cathode, the fuel cell electrode catalysts of the present invention were produced. Further, performance of these fuel cells was evaluated. The results of the evaluations are shown in Table 7.

Note that the molecular metal complex expressed by the Chemical Formula (141) was synthesized with reference to D. Sellmann, R. Prakash, F. W. Heinemann, M. Moll and M. Klimowicz, Angew. Chem., Int. Ed., 2004, 43, 1877-1880.

Example 26

In the same manner as in Example 1 except that the molecular metal complex expressed by the Chemical Formula (142) was used instead of the molecular metal complex expressed by the Chemical Formula (117), a fuel cell (Example 26-76) including, in the anode, the fuel cell electrode catalyst of the present invention, a fuel cell (Example 26-77) including, in the cathode, the fuel cell electrode catalyst of the present invention, and a fuel cell (Example 26-78) including, in the anode and the cathode, the fuel cell electrode catalysts of the present invention were produced. Further, performance of these fuel cells was evaluated. The results of the evaluations are shown in Table 7.

Note that the molecular metal complex expressed by the Chemical Formula (142) was synthesized with reference to R. C. Linck, R. J. Pafford and T. B. Rauchfuss, J. Am. Chem. Soc., 2001, 123, 8856-8857.

Example 27

In the same manner as in Example 1 except that the molecular metal complex expressed by the Chemical Formula (143) was used instead of the molecular metal complex expressed by the Chemical Formula (117), a fuel cell (Example 27-79) including, in the anode, the fuel cell electrode catalyst of the present invention, a fuel cell (Example 27-80) including, in the cathode, the fuel cell electrode catalyst of the present invention, and a fuel cell (Example 27-81) including, in the anode and the cathode, the fuel cell electrode catalysts of the present invention were produced. Further, performance of these fuel cells was evaluated. The results of the evaluations are shown in Table 7.

Note that the molecular metal complex expressed by the Chemical Formula (143) was synthesized with reference to R. C. Linck, R. J. Pafford and T. B. Rauchfuss, J. Am. Chem. Soc., 2001, 123, 8856-8857.

Example 28

In the same manner as in Example 1 except that the molecular metal complex expressed by the Chemical Formula (144) was used instead of the molecular metal complex expressed by the Chemical Formula (117), a fuel cell (Example 28-82) including, in the anode, the fuel cell electrode catalyst of the present invention, a fuel cell (Example 28-83) including, in the cathode, the fuel cell electrode catalyst of the present invention, and a fuel cell (Example 28-84) including, in the anode and the cathode, the fuel cell electrode catalysts of the present invention were produced. Further, performance of these fuel cells was evaluated. The results of the evaluations are shown in Table 7.

Note that the molecular metal complex expressed by the Chemical Formula (144) was synthesized with reference to L. L. Lopez, P. Bernatis, J. Birnbaum, R. C. Haltiwanger and M. R. DuBois, Organometallics, 1992, 11, 2424-2435.

TABLE 7

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 25-73 | Yes | Yes | No | Chemical Formula (141) | Nafion | Nafion NRE212 | Nafion | Pt | No | Yes | Yes | 0.3 | 0.001 |
| 25-74 | Yes | Yes | Yes | Pt | Nafion | Nafion NRE212 | Nafion | Chemical Formula (141) | No | Yes | Yes | 0.35 | 0.001 |
| 25-75 | Yes | Yes | Yes | Chemical Formula (141) | Nafion | Nafion NRE212 | Nafion | Chemical Formula (141) | No | Yes | Yes | 0.12 | 0.001 |
| 26-76 | Yes | Yes | No | Chemical Formula (142) | Nafion | Nafion NRE212 | Nafion | Pt | No | Yes | Yes | 0.31 | 0.001 |
| 26-77 | Yes | Yes | Yes | Pt | Nafion | Nafion NRE212 | Nafion | Chemical Formula (142) | No | Yes | Yes | 0.31 | 0.001 |
| 26-78 | Yes | Yes | Yes | Chemical Formula (142) | Nafion | Nafion NRE212 | Nafion | Chemical Formula (142) | No | Yes | Yes | 0.2 | 0.001 |
| 27-79 | Yes | Yes | No | Chemical Formula (143) | Nafion | Nafion NRE212 | Nafion | Pt | No | Yes | Yes | 0.2 | 0.001 |
| 27-80 | Yes | Yes | Yes | Pt | Nafion | Nafion NRE212 | Nafion | Chemical Formula (143) | No | Yes | Yes | 0.1 | 0.001 |
| 27-81 | Yes | Yes | Yes | Chemical Formula (143) | Nafion | Nafion NRE212 | Nafion | Chemical Formula (143) | No | Yes | Yes | 0.05 | 0.001 |
| 28-82 | Yes | Yes | No | Chemical Formula (144) | Nafion | Nafion NRE212 | Nafion | Pt | No | Yes | Yes | 0.3 | 0.001 |
| 28-83 | Yes | Yes | Yes | Pt | Nafion | Nafion NRE212 | Nafion | Chemical Formula (144) | No | Yes | Yes | 0.2 | 0.001 |
| 28-84 | Yes | Yes | Yes | Chemical Formula (144) | Nafion | Nafion NRE212 | Nafion | Chemical Formula (144) | No | Yes | Yes | 0.1 | 0.001 |

Example 29

In the same manner as in Example 1 except that the molecular metal complex expressed by the Chemical Formula (145) was used instead of the molecular metal complex expressed by the Chemical Formula (117), a fuel cell (Example 29-85) including, in the anode, the fuel cell electrode catalyst of the present invention, a fuel cell (Example 29-86) including, in the cathode, the fuel cell electrode catalyst of the present invention, and a fuel cell (Example 29-87)

including, in the anode and the cathode, the fuel cell electrode catalysts of the present invention were produced. Further, performance of these fuel cells was evaluated. The results of the evaluations are shown in Table 8.

Note that the molecular metal complex expressed by the Chemical Formula (145) was synthesized with reference to L. L. Lopez, P. Bernatis, J. Birnbaum, R. C. Haltiwanger and M. R. DuBois, Organometallics, 1992, 11, 2424-2435.

Example 30

In the same manner as in Example 1 except that the molecular metal complex expressed by the Chemical Formula (146) was used instead of the molecular metal complex expressed by the Chemical Formula (117), a fuel cell (Example 30-88) including, in the anode, the fuel cell electrode catalyst of the present invention, a fuel cell (Example 30-89) including, in the cathode, the fuel cell electrode catalyst of the present invention, and a fuel cell (Example 30-90) including, in the anode and the cathode, the fuel cell electrode catalysts of the present invention were produced. Further, performance of these fuel cells was evaluated. The results of the evaluations are shown in Table 8.

Note that the molecular metal complex expressed by the Chemical Formula (146) was synthesized with reference to (a) C. Bianchini, C. Mealli, A. Meli and M. Sabat, Inorg. Chem., 1986, 25, 4617-4618; (b) A. Ienco, M. J. Calhorda, J. Reinhold, F. Rcineri, C. Bianchini, M. Peruzzini, F. Vizza and C. Mealli, J. Am. Chem. Soc., 2004, 126, 11954-11965.

Example 31

In the same manner as in Example 1 except that the molecular metal complex expressed by the Chemical Formula (147) was used instead of the molecular metal complex expressed by the Chemical Formula (117), a fuel cell (Example 31-91) including, in the anode, the fuel cell electrode catalyst of the present invention, a fuel cell (Example 31-92) including, in the cathode, the fuel cell electrode catalyst of the present invention, and a fuel cell (Example 31-93) including, in the anode and the cathode, the fuel cell electrode catalysts of the present invention were produced. Further, performance of these fuel cells was evaluated. The results of the evaluations are shown in Table 8.

Note that the molecular metal complex expressed by the Chemical Formula (147) was synthesized with reference to (a) C. Bianchini, C. Mealli, A. Meli and M. Sabat, Inorg. Chem., 1986, 25, 4617-4618; (b) A. Ienco, M. J. Calhorda, J. Reinhold, F. Reineri, C. Bianchini, M. Peruzzini, F. Vizza and C. Mealli, J. Am. Chem. Soc., 2004, 126, 11954-11965.

Example 32

In the same manner as in Example 1 except that the molecular metal complex expressed by the Chemical Formula (148) was used instead of the molecular metal complex expressed by the Chemical Formula (117), a fuel cell (Example 32-94) including, in the anode, the fuel cell electrode catalyst of the present invention, a fuel cell (Example 32-95) including, in the cathode, the fuel cell electrode catalyst of the present invention, and a fuel cell (Example 32-96) including, in the anode and the cathode, the fuel cell electrode catalysts of the present invention were produced. Further, performance of these fuel cells was evaluated. The results of the evaluations are shown in Table 8.

Note that the molecular metal complex expressed by the Chemical Formula (148) was synthesized with reference to S. Ogo, H. Nakai and Y. Watanabe, J. Am. Chem. Soc., 2002, 124, 597-601.

TABLE 8

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 29-85 | Yes | Yes | No | Chemical Formula (145) | Nafion | Nafion NRE212 | Nafion | Pt | No | Yes | Yes | 0.35 | 0.001 |
| 29-86 | Yes | Yes | Yes | Pt | Nafion | Nafion NRE212 | Nafion | Chemical Formula (145) | No | Yes | Yes | 0.35 | 0.001 |
| 29-87 | Yes | Yes | Yes | Chemical Formula (145) | Nafion | Nafion NRE212 | Nafion | Chemical Formula (145) | No | Yes | Yes | 0.2 | 0.001 |
| 30-88 | Yes | Yes | No | Chemical Formula (146) | Nafion | Nafion NRE212 | Nafion | Pt | No | Yes | Yes | 0.34 | 0.001 |
| 30-89 | Yes | Yes | Yes | Pt | Nafion | Nafion NRE212 | Nafion | Chemical Formula (146) | No | Yes | Yes | 0.31 | 0.001 |
| 30-90 | Yes | Yes | Yes | Chemical Formula (146) | Nafion | Nafion NRE212 | Nafion | Chemical Formula (146) | No | Yes | Yes | 0.15 | 0.001 |
| 31-91 | Yes | Yes | No | Chemical Formula (147) | Nafion | Nafion NRE212 | Nafion | Pt | No | Yes | Yes | 0.38 | 0.001 |
| 31-92 | Yes | Yes | Yes | Pt | Nafion | Nafion NRE212 | Nafion | Chemical Formula (147) | No | Yes | Yes | 0.28 | 0.001 |
| 31-93 | Yes | Yes | Yes | Chemical Formula (147) | Nafion | Nafion NRE212 | Nafion | Chemical Formula (147) | No | Yes | Yes | 0.15 | 0.001 |
| 32-94 | Yes | Yes | No | Chemical Formula (148) | Nafion | Nafion NRE212 | Nafion | Pt | No | Yes | Yes | 0.31 | 0.001 |

TABLE 8-continued

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 32-95 | Yes | Yes | Yes | Pt | Nafion | Nafion NRE212 | Nafion | Chemical Formula (148) | No | Yes | Yes | 0.33 | 0.001 |
| 32-96 | Yes | Yes | Yes | Chemical Formula (148) | Nafion | Nafion NRE212 | Nafion | Chemical Formula (148) | No | Yes | Yes | 0.12 | 0.001 |

Example 33

In the same manner as in Example 1 except that the molecular metal complex expressed by the Chemical Formula (149) was used instead of the molecular metal complex expressed by the Chemical Formula (117), a fuel cell (Example 33-97) including, in the anode, the fuel cell electrode catalyst of the present invention, a fuel cell (Example 33-98) including, in the cathode, the fuel cell electrode catalyst of the present invention, and a fuel cell (Example 33-99) including, in the anode and the cathode, the fuel cell electrode catalysts of the present invention were produced. Further, performance of these fuel cells was evaluated. The results of the evaluations are shown in Table 9.

Note that the molecular metal complex expressed by the Chemical Formula (149) was synthesized with reference to S. Ogo, H. Nakai and Y. Watanabe, J. Am. Chem. Soc., 2002, 124, 597-601.

Example 34

In the same manner as in Example 1 except that the molecular metal complex expressed by the Chemical Formula (150) was used instead of the molecular metal complex expressed by the Chemical Formula (117), a fuel cell (Example 34-100) including, in the anode, the fuel cell electrode catalyst of the present invention, a fuel cell (Example 34-101) including, in the cathode, the fuel cell electrode catalyst of the present invention, and a fuel cell (Example 34-102) including, in the anode and the cathode, the fuel cell electrode catalysts of the present invention were produced. Further, performance of these fuel cells was evaluated. The results of the evaluations are shown in Table 9.

Note that the molecular metal complex expressed by the Chemical Formula (150) was synthesized with reference to S. Ogo, T. Suzuki, S. Nomura, K. Asakura and K. Isobe, J. Cluster Science 1995, 6, 421-436.

Example 35

In the same manner as in Example 1 except that the molecular metal complex expressed by the Chemical Formula (151) was used instead of the molecular metal complex expressed by the Chemical Formula (117), a fuel cell (Example 35-103) including, in the anode, the fuel cell electrode catalyst of the present invention, a fuel cell (Example 35-104) including, in the cathode, the fuel cell electrode catalyst of the present invention, and a fuel cell (Example 35-105) including, in the anode and the cathode, the fuel cell electrode catalysts of the present invention were produced. Further, performance of these fuel cells was evaluated. The results of the evaluations are shown in Table 9.

Note that the molecular metal complex expressed by the Chemical Formula (151) was synthesized with reference to L. Vieille-Petit, G. Suss-Fink, B. Therrien, T. R. Ward, H. Stoeckli-Evans, G. Labat, L. Karmazin-Brelot, A. Neels, T. Burgi, R. G. Finke and C. M. Hagen, Organometallics, 2005, 24, 6104-6119.

TABLE 9

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 33-97 | Yes | Yes | No | Chemical Formula (149) | Nafion | Nafion NRE212 | Nafion | Pt | No | Yes | Yes | 0.25 | 0.001 |
| 33-98 | Yes | Yes | Yes | Pt | Nafion | Nafion NRE212 | Nafion | Chemical Formula (149) | No | Yes | Yes | 0.29 | 0.001 |
| 33-99 | Yes | Yes | Yes | Chemical Formula (149) | Nafion | Nafion NRE212 | Nafion | Chemical Formula (149) | No | Yes | Yes | 0.11 | 0.001 |
| 34-100 | Yes | Yes | No | Chemical Formula (150) | Nafion | Nafion NRE212 | Nafion | Pt | No | Yes | Yes | 0.3 | 0.001 |
| 34-101 | Yes | Yes | Yes | Pt | Nafion | Nafion NRE212 | Nafion | Chemical Formula (150) | No | Yes | Yes | 0.3 | 0.001 |
| 34-102 | Yes | Yes | Yes | Chemical Formula (150) | Nafion | Nafion NRE212 | Nafion | Chemical Formula (150) | No | Yes | Yes | 0.12 | 0.001 |
| 35-103 | Yes | Yes | No | Chemical Formula (151) | Nafion | Nafion NRE212 | Nafion | Pt | No | Yes | Yes | 0.31 | 0.001 |
| 35-104 | Yes | Yes | Yes | Pt | Nafion | Nafion NRE212 | Nafion | Chemical Formula (151) | No | Yes | Yes | 0.26 | 0.001 |

TABLE 9-continued

| Carbon cloth | Vulcan | Conductive polymer | Hydrogen electrode | Ionomer | Polymer membrane | Ionomer | Oxygen electrode | Conductive polymer | Vulcan | Carbon cloth | Electro-motive force/V | Maximum current/ A cm$^{-2}$ |
|---|---|---|---|---|---|---|---|---|---|---|---|---|
| 35-105 | Yes | Yes | Yes | Chemical Formula (151) | Nafion | Nafion NRE212 | Nafion | Chemical Formula (151) | No | Yes | Yes | 0.1 | 0.001 |

Example 36

<Production of Carbon Cloth to which Fuel Cell Electrode Catalyst of the Present Invention being in the Form of Solution is Applied>

10 mg of the molecular metal complex expressed by the Chemical Formula (117) being in the form of a solution was evenly applied onto a carbon cloth (manufactured by E-TEK) of 5 cm$^2$. Specifically, the molecular metal complex is dissolved in 100 mg of a Nafion (Registered Trademark) solution, and the resultant solution was applied onto the carbon cloth.

Note that the molecular metal complex expressed by the Chemical Formula (117) was synthesized in the same manner as in Example 1.

Example 36-106: Production of Fuel Cell Including, in Anode, Fuel Cell Electrode Catalyst of the Present Invention A membrane electrode assembly (MEA) was produced by (i) providing, on the hydrogen electrode (anode) side, a carbon cloth to which the molecular metal complex being in the form of a solution was applied and (ii) providing, on the oxygen electrode (cathode) side, a carbon cloth to which platinum carbon TEC10V50E (manufactured by Takana Kikinzoku Kogyo K.K.) was applied so that a polymer membrane (Nafion (Registered Trademark) NRE212, manufactured by DuPont) was sandwiched by these carbon cloths. The membrane electrode assembly thus obtained was incorporated into a fuel cell (manufactured by Toyo Corporation). In this manner, a fuel cell was produced. In the above process, the polymer membrane was sandwiched by the carbon cloths so that (i) a side of one of the carbon clothes to which side the molecular metal complex being in the form of a solution was applied and (ii) a side of the other of the carbon cloths to which side platinum was applied face each other via the polymer membrane. Hydrogen and oxygen were supplied to the fuel cell thus produced, and an electromotive force of the fuel cell was measured. The result of the measurement is shown in Table 10.

Note that the fuel cell thus produced was configured such that each of the hydrogen electrode (anode) and the oxygen electrode (cathode) contains Vulcan (manufactured by Cabot Corporation) and Nafion (Registered Trademark) functioning as an ionomer. Specifically, 10 mg of the molecular metal complex and 60 mg of Vulcan were added to 100 mg of a Nafion (Registered Trademark) solution (Nafion perfluorinated ion-exchange resin, 5 wt % soln in lower aliphatic alcohols/H$_2$O mix [product name], manufactured by Aldrich), and the mixture was dispersed by an ultrasonic vibration machine. Then, the resultant solution was applied to a carbon cloth. In a similar way, platinum carbon was applied to a carbon cloth.

Example 36-107: Production of Fuel Cell Including, in Cathode, Fuel Cell Electrode Catalyst of the Present Invention A membrane electrode assembly (MEA) was produced by (i) providing, on the hydrogen electrode side, a carbon cloth to which platinum carbon TEC10V50E (manufactured by Takana Kikinzoku Kogyo K.K.) was applied and (ii) providing, on the oxygen electrode side, a carbon cloth to which the molecular metal complex in the form of a solution was applied so that a polymer membrane (Nafion [Registered Trademark] NRE212, manufactured by DuPont) was sandwiched by these carbon cloths. The membrane electrode assembly thus obtained was incorporated into a fuel cell (manufactured by Toyo Corporation). In this manner, a fuel cell was produced. In the above process, the polymer membrane was sandwiched by the carbon cloths so that (i) a side of one of the carbon cloths to which side the molecular metal complex in the form of a solution was applied and (ii) a side of the other of the carbon cloths to which side platinum was applied face each other via the polymer membrane. Hydrogen and oxygen were supplied to the fuel cell thus produced, and an electromotive force of the fuel cell was measured. The result of the measurement is shown in Table 10.

Note that the fuel cell thus produced was configured such that each of the hydrogen electrode (anode) and the oxygen electrode (cathode) contains Vulcan (manufactured by Cabot Corporation) and Nafion (Registered Trademark) functioning as an ionomer. Specifically, 10 mg of the molecular metal complex and 60 mg of Vulcan were added to 100 mg of a Nafion (Registered Trademark) solution (Nafion perfluorinated ion-exchange resin, 5 wt % soln in lower aliphatic alcohols/H$_2$O mix [product name], manufactured by Aldrich), and the mixture was dispersed by the ultrasonic vibration machine. Then, the resultant solution was applied to a carbon cloth. In a similar way, platinum carbon was applied to a carbon cloth. Further, the hydrogen electrode includes, as a conductive polymer, polypyrrole which was caused to be supported by Vulcan with reference to Non-Patent Literature 2.

Example 36-108: Production of Fuel Cell Including, in Anode and Cathode, Fuel Cell Electrode Catalysts of the Present Invention A membrane electrode assembly (MEA) was produced by providing, on both of the hydrogen electrode side and the oxygen electrode side, carbon cloths to each of which the molecular metal complex in the form of a solution was applied so that a polymer membrane (Nafion [Registered Trademark] NRE212, manufactured by DuPont) was sandwiched by these carbon cloths. The membrane electrode assembly thus obtained was incorporated into a fuel cell (manufactured by Toyo Corporation). In this manner, a fuel cell was produced. In the above process, the polymer membrane was sandwiched by the carbon cloths so that sides of the respective carbon cloths to each of which sides the molecular metal complex in the form of a solution was applied face each other via the polymer membrane. Hydrogen and oxygen were supplied to the fuel cell thus produced, and an electromotive force of the fuel cell was measured. The result of the measurement is shown in Table 10.

Note that the fuel cell thus produced was configured such that each of the hydrogen electrode (anode) and the oxygen electrode (cathode) contains Vulcan (manufactured by Cabot Corporation) and Nafion (Registered Trademark) functioning as an ionomer. Specifically, 10 mg of the molecular metal complex and 60 mg of Vulcan were added to 100 mg of a Nafion (Registered Trademark) solution (Nafion perfluorinated ion-exchange resin, 5 wt % soln in lower aliphatic alcohols/$H_2O$ mix [product name], manufactured by Aldrich), and the mixture was dispersed by the ultrasonic vibration machine. Then, the resultant solution was applied to a carbon cloth. Note that the hydrogen electrode includes, as a conductive polymer, polypyrrole which was caused to be supported by Vulcan with reference to Non-Patent Literature 2.

In Examples 1 to 35, the molecular metal complex was dispersed in a Nafion solution, applied to a carbon cloth, and then dried under reduced pressure to function as an electrode catalyst in the form of a solid. In Examples 36 to 58, on the other hand, the molecular metal complex was applied to a carbon cloth in the form of a solution, and was not dried under reduced pressure. This intended to cause the molecular metal complex to function as an electrode catalyst in the form of a solution, and took into consideration the fact that the molecular metal complex, once dried into the form of a solid, is not easily dissolved in water again.

Example 37

In the same manner as in Example 36 except that the molecular metal complex expressed by the Chemical Formula (118) was used instead of the molecular metal complex expressed by the Chemical Formula (117), a fuel cell (Example 37-109) including, in the anode, the fuel cell electrode catalyst of the present invention, a fuel cell (Example 37-110) including, in the cathode, the fuel cell electrode catalyst of the present invention, and a fuel cell (Example 37-111) including, in the anode and the cathode, the fuel cell electrode catalysts of the present invention were produced. Further, performance of these fuel cells was evaluated. The results of the evaluations are shown in Table 10.

Note that the molecular metal complex expressed by the Chemical Formula (118) was synthesized in the same manner as in Example 2.

Example 38

In the same manner as in Example 36 except that the molecular metal complex expressed by the Chemical Formula (119) was used instead of the molecular metal complex expressed by the Chemical Formula (117), a fuel cell (Example 38-112) including, in the anode, the fuel cell electrode catalyst of the present invention, a fuel cell (Example 38-113) including, in the cathode, the fuel cell electrode catalyst of the present invention, and a fuel cell (Example 38-114) including, in the anode and the cathode, the fuel cell electrode catalysts of the present invention were produced. Further, performance of these fuel cells was evaluated. The results of the evaluations are shown in Table 10.

Note that the molecular metal complex expressed by the Chemical Formula (119) was synthesized in the same manner as in Example 3.

Example 39

In the same manner as in Example 36 except that the molecular metal complex expressed by the Chemical Formula (120) was used instead of the molecular metal complex expressed by the Chemical Formula (117), a fuel cell (Example 39-115) including, in the anode, the fuel cell electrode catalyst of the present invention, a fuel cell (Example 39-116) including, in the cathode, the fuel cell electrode catalyst of the present invention, and a fuel cell (Example 39-117) including, in the anode and the cathode, the fuel cell electrode catalysts of the present invention were produced. Further, performance of these fuel cells was evaluated. The results of the evaluations are shown in Table 10.

Note that the molecular metal complex expressed by the Chemical Formula (120) was synthesized in the same manner as in Example 4.

TABLE 10

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A $cm^{-2}$ |
|---|---|---|---|---|---|---|---|---|---|---|---|---|---|
| 36-106 | Yes | Yes | No | Chemical Formula (117) | Nafion | Nafion NRE212 | Nafion | Pt | No | Yes | Yes | 0.35 | 0.001 |
| 36-107 | Yes | Yes | Yes | Pt | Nafion | Nafion NRE212 | Nafion | Chemical Formula (117) | No | Yes | Yes | 0.35 | 0.001 |
| 36-108 | Yes | Yes | Yes | Chemical Formula (117) | Nafion | Nafion NRE212 | Nafion | Chemical Formula (117) | No | Yes | Yes | 0.15 | 0.001 |
| 37-109 | Yes | Yes | No | Chemical Formula (118) | Nafion | Nafion NRE212 | Nafion | Pt | No | Yes | Yes | 0.3 | 0.001 |
| 37-110 | Yes | Yes | Yes | Pt | Nafion | Nafion NRE212 | Nafion | Chemical Formula (118) | No | Yes | Yes | 0.3 | 0.001 |
| 37-111 | Yes | Yes | Yes | Chemical Formula (118) | Nafion | Nafion NRE212 | Nafion | Chemical Formula (118) | No | Yes | Yes | 0.1 | 0.001 |
| 38-112 | Yes | Yes | No | Chemical Formula (119) | Nafion | Nafion NRE212 | Nafion | Pt | No | Yes | Yes | 0.25 | 0.001 |
| 38-113 | Yes | Yes | Yes | Pt | Nafion | Nafion NRE212 | Nafion | Chemical Formula (119) | No | Yes | Yes | 0.25 | 0.001 |

TABLE 10-continued

| | Carbon cloth | Vulcan | Conductive polymer | Hydrogen electrode | Ionomer | Polymer membrane | Ionomer | Oxygen electrode | Conductive polymer | Vulcan | Carbon cloth | Electro-motive force/V | Maximum current/ A cm$^{-2}$ |
|---|---|---|---|---|---|---|---|---|---|---|---|---|---|
| 38 - 114 | Yes | Yes | Yes | Chemical Formula (119) | Nafion | Nafion NRE212 | Nafion | Chemical Formula (119) | No | Yes | Yes | 0.15 | 0.001 |
| 39 - 115 | Yes | Yes | No | Chemical Formula (120) | Nafion | Nafion NRE212 | Nafion | Pt | No | Yes | Yes | 0.1 | 0.001 |
| 39 - 116 | Yes | Yes | Yes | Pt | Nafion | Nafion NRE212 | Nafion | Chemical Formula (120) | No | Yes | Yes | 0.1 | 0.001 |
| 39 - 117 | Yes | Yes | Yes | Chemical Formula (120) | Nafion | Nafion NRE212 | Nafion | Chemical Formula (120) | No | Yes | Yes | 0.05 | 0.001 |

Example 40

In the same manner as in Example 36 except that the molecular metal complex expressed by the Chemical Formula (121) was used instead of the molecular metal complex expressed by the Chemical Formula (117), a fuel cell (Example 40-118) including, in the anode, the fuel cell electrode catalyst of the present invention, a fuel cell (Example 40-119) including, in the cathode, the fuel cell electrode catalyst of the present invention, and a fuel cell (Example 40-120) including, in the anode and the cathode, the fuel cell electrode catalysts of the present invention were produced. Further, performance of these fuel cells was evaluated. The results of the evaluations are shown in Table 11.

Note that the molecular metal complex expressed by the Chemical Formula (121) was synthesized in the same manner as in Example 5.

Example 41

In the same manner as in Example 36 except that the molecular metal complex expressed by the Chemical Formula (122) was used instead of the molecular metal complex expressed by the Chemical Formula (117), a fuel cell (Example 41-121) including, in the anode, the fuel cell electrode catalyst of the present invention, a fuel cell (Example 41-122) including, in the cathode, the fuel cell electrode catalyst of the present invention, and a fuel cell (Example 41-123) including, in the anode and the cathode, the fuel cell electrode catalysts of the present invention were produced. Further, performance of these fuel cells was evaluated. The results of the evaluations are shown in Table 11.

Note that the molecular metal complex expressed by the Chemical Formula (122) was synthesized in the same manner as in Example 6.

Example 42

In the same manner as in Example 36 except that the molecular metal complex expressed by the Chemical Formula (123) was used instead of the molecular metal complex expressed by the Chemical Formula (117), a fuel cell (Example 42-1124) including, in the anode, the fuel cell electrode catalyst of the present invention, a fuel cell (Example 43-125) including, in the cathode, the fuel cell electrode catalyst of the present invention, and a fuel cell (Example 42-126) including, in the anode and the cathode, the fuel cell electrode catalysts of the present invention were produced. Further, performance of these fuel cells was evaluated. The results of the evaluations are shown in Table 11.

Note that the molecular metal complex expressed by the Chemical Formula (123) was synthesized in the same manner as in Example 7.

Example 43

In the same manner as in Example 36 except that the molecular metal complex expressed by the Chemical Formula (124) was used instead of the molecular metal complex expressed by the Chemical Formula (117), a fuel cell (Example 43-127) including, in the anode, the fuel cell electrode catalyst of the present invention, a fuel cell (Example 43-128) including, in the cathode, the fuel cell electrode catalyst of the present invention, and a fuel cell (Example 43-129) including, in the anode and the cathode, the fuel cell electrode catalysts of the present invention were produced. Further, performance of these fuel cells was evaluated. The results of the evaluations are shown in Table 11.

Note that the molecular metal complex expressed by the Chemical Formula (124) was synthesized in the same manner as in Example 8.

TABLE 11

| | Carbon cloth | Vulcan | Conductive polymer | Hydrogen electrode | Ionomer | Polymer membrane | Ionomer | Oxygen electrode | Conductive polymer | Vulcan | Carbon cloth | Electro-motive force/V | Maximum current/ A cm$^{-2}$ |
|---|---|---|---|---|---|---|---|---|---|---|---|---|---|
| 40 - 118 | Yes | Yes | No | Chemical Formula (121) | Nafion | Nafion NRE212 | Nafion | Pt | No | Yes | Yes | 0.30 | 0.001 |
| 40 - 119 | Yes | Yes | Yes | Pt | Nafion | Nafion NRE212 | Nafion | Chemical Formula (121) | No | Yes | Yes | 0.25 | 0.001 |
| 40 - 120 | Yes | Yes | Yes | Chemical Formula (121) | Nafion | Nafion NRE212 | Nafion | Chemical Formula (121) | No | Yes | Yes | 0.1 | 0.001 |

TABLE 11-continued

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 41-121 | Yes | Yes | No | Chemical Formula (122) | Nafion | Nafion NRE212 | Nafion | Pt | No | Yes | Yes | 0.25 | 0.001 |
| 41-122 | Yes | Yes | Yes | Pt | Nafion | Nafion NRE212 | Nafion | Chemical Formula (122) | No | Yes | Yes | 0.25 | 0.001 |
| 41-123 | Yes | Yes | Yes | Chemical Formula (122) | Nafion | Nafion NRE212 | Nafion | Chemical Formula (122) | No | Yes | Yes | 0.15 | 0.001 |
| 42-124 | Yes | Yes | No | Chemical Formula (123) | Nafion | Nafion NRE212 | Nafion | Pt | No | Yes | Yes | 0.35 | 0.001 |
| 42-125 | Yes | Yes | Yes | Pt | Nafion | Nafion NRE212 | Nafion | Chemical Formula (123) | No | Yes | Yes | 0.3 | 0.001 |
| 42-126 | Yes | Yes | Yes | Chemical Formula (123) | Nafion | Nafion NRE212 | Nafion | Chemical Formula (123) | No | Yes | Yes | 0.2 | 0.001 |
| 43-127 | Yes | Yes | No | Chemical Formula (124) | Nafion | Nafion NRE212 | Nafion | Pt | No | Yes | Yes | 0.23 | 0.001 |
| 43-128 | Yes | Yes | Yes | Pt | Nafion | Nafion NRE212 | Nafion | Chemical Formula (124) | No | Yes | Yes | 0.3 | 0.001 |
| 43-129 | Yes | Yes | Yes | Chemical Formula (124) | Nafion | Nafion NRE212 | Nafion | Chemical Formula (124) | No | Yes | Yes | 0.1 | 0.001 |

Example 44

In the same manner as in Example 36 except that the molecular metal complex expressed by the Chemical Formula (125) was used instead of the molecular metal complex expressed by the Chemical Formula (117), a fuel cell (Example 44-130) including, in the anode, the fuel cell electrode catalyst of the present invention, a fuel cell (Example 44-131) including, in the cathode, the fuel cell electrode catalyst of the present invention, and a fuel cell (Example 44-132) including, in the anode and the cathode, the fuel cell electrode catalysts of the present invention were produced. Further, performance of these fuel cells was evaluated. The results of the evaluations are shown in Table 12.

Note that the molecular metal complex expressed by the Chemical Formula (125) was synthesized in the same manner as in Example 9.

Example 45

In the same manner as in Example 36 except that the molecular metal complex expressed by the Chemical Formula (126) was used instead of the molecular metal complex expressed by the Chemical Formula (117), a fuel cell (Example 45-133) including, in the anode, the fuel cell electrode catalyst of the present invention, a fuel cell (Example 45-134) including, in the cathode, the fuel cell electrode catalyst of the present invention, and a fuel cell (Example 45-135) including, in the anode and the cathode, the fuel cell electrode catalysts of the present invention were produced. Further, performance of these fuel cells was evaluated. The results of the evaluations are shown in Table 12.

Note that the molecular metal complex expressed by the Chemical Formula (126) was synthesized in the same manner as in Example 10.

Example 46

In the same manner as in Example 36 except that the molecular metal complex expressed by the Chemical Formula (127) was used instead of the molecular metal complex expressed by the Chemical Formula (117), a fuel cell (Example 46-136) including, in the anode, the fuel cell electrode catalyst of the present invention, a fuel cell (Example 46-137) including, in the cathode, the fuel cell electrode catalyst of the present invention, and a fuel cell (Example 46-138) including, in the anode and the cathode, the fuel cell electrode catalysts of the present invention were produced. Further, performance of these fuel cells was evaluated. The results of the evaluations are shown in Table 12.

Note that the molecular metal complex expressed by the Chemical Formula (127) was synthesized in the same manner as in Example 11.

Example 47

In the same manner as in Example 36 except that the molecular metal complex expressed by the Chemical Formula (128) was used instead of the molecular metal complex expressed by the Chemical Formula (117), a fuel cell (Example 47-139) including, in the anode, the fuel cell electrode catalyst of the present invention, a fuel cell (Example 47-140) including, in the cathode, the fuel cell electrode catalyst of the present invention, and a fuel cell (Example 47-141) including, in the anode and the cathode, the fuel cell electrode catalysts of the present invention were produced. Further, performance of these fuel cells was evaluated. The results of the evaluations are shown in Table 12.

Note that the molecular metal complex expressed by the Chemical Formula (128) was synthesized in the same manner as in Example 12.

TABLE 12

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 44-130 | Yes | Yes | No | Chemical Formula (125) | Nafion | Nafion NRE212 | Nafion | Pt | No | Yes | Yes | 0.3 | 0.001 |
| 44-131 | Yes | Yes | Yes | Pt | Nafion | Nafion NRE212 | Nafion | Chemical Formula (125) | No | Yes | Yes | 0.2 | 0.001 |
| 44-132 | Yes | Yes | Yes | Chemical Formula (125) | Nafion | Nafion NRE212 | Nafion | Chemical Formula (125) | No | Yes | Yes | 0.1 | 0.001 |
| 45-133 | Yes | Yes | No | Chemical Formula (126) | Nafion | Nafion NRE212 | Nafion | Pt | No | Yes | Yes | 0.32 | 0.001 |
| 45-134 | Yes | Yes | Yes | Pt | Nafion | Nafion NRE212 | Nafion | Chemical Formula (126) | No | Yes | Yes | 0.3 | 0.001 |
| 45-135 | Yes | Yes | Yes | Chemical Formula (126) | Nafion | Nafion NRE212 | Nafion | Chemical Formula (126) | No | Yes | Yes | 0.18 | 0.001 |
| 46-136 | Yes | Yes | No | Chemical Formula (127) | Nafion | Nafion NRE212 | Nafion | Pt | No | Yes | Yes | 0.3 | 0.001 |
| 46-137 | Yes | Yes | Yes | Pt | Nafion | Nafion NRE212 | Nafion | Chemical Formula (127) | No | Yes | Yes | 0.2 | 0.001 |
| 46-138 | Yes | Yes | Yes | Chemical Formula (127) | Nafion | Nafion NRE212 | Nafion | Chemical Formula (127) | No | Yes | Yes | 0.05 | 0.001 |
| 47-139 | Yes | Yes | No | Chemical Formula (128) | Nafion | Nafion NRE212 | Nafion | Pt | No | Yes | Yes | 0.2 | 0.001 |
| 47-140 | Yes | Yes | Yes | Pt | Nafion | Nafion NRE212 | Nafion | Chemical Formula (128) | No | Yes | Yes | 0.2 | 0.001 |
| 47-141 | Yes | Yes | Yes | Chemical Formula (128) | Nafion | Nafion NRE212 | Nafion | Chemical Formula (128) | No | Yes | Yes | 0.1 | 0.001 |

Example 48

In the same manner as in Example 36 except that the molecular metal complex expressed by the Chemical Formula (129) was used instead of the molecular metal complex expressed by the Chemical Formula (117), a fuel cell (Example 48-142) including, in the anode, the fuel cell electrode catalyst of the present invention, a fuel cell (Example 48-143) including, in the cathode, the fuel cell electrode catalyst of the present invention, and a fuel cell (Example 48-144) including, in the anode and the cathode, the fuel cell electrode catalysts of the present invention were produced. Further, performance of these fuel cells was evaluated. The results of the evaluations are shown in Table 13.

Note that the molecular metal complex expressed by the Chemical Formula (129) was synthesized in the same manner as in Example 13.

Example 49

In the same manner as in Example 36 except that the molecular metal complex expressed by the Chemical Formula (130) was used instead of the molecular metal complex expressed by the Chemical Formula (117), a fuel cell (Example 49-145) including, in the anode, the fuel cell electrode catalyst of the present invention, a fuel cell (Example 49-146) including, in the cathode, the fuel cell electrode catalyst of the present invention, and a fuel cell (Example 49-147) including, in the anode and the cathode, the fuel cell electrode catalysts of the present invention were produced. Further, performance of these fuel cells was evaluated. The results of the evaluations are shown in Table 13.

Note that the molecular metal complex expressed by the Chemical Formula (130) was synthesized in the same manner as in Example 14.

Example 50

In the same manner as in Example 36 except that the molecular metal complex expressed by the Chemical Formula (131) was used instead of the molecular metal complex expressed by the Chemical Formula (117), a fuel cell (Example 50-148) including, in the anode, the fuel cell electrode catalyst of the present invention, a fuel cell (Example 50-149) including, in the cathode, the fuel cell electrode catalyst of the present invention, and a fuel cell (Example 50-150) including, in the anode and the cathode, the fuel cell electrode catalysts of the present invention were produced. Further, performance of these fuel cells was evaluated. The results of the evaluations are shown in Table 13.

Note that the molecular metal complex expressed by the Chemical Formula (131) was synthesized in the same manner as in Example 15.

Example 51

In the same manner as in Example 36 except that the molecular metal complex expressed by the Chemical Formula (132) was used instead of the molecular metal complex expressed by the Chemical Formula (117), a fuel cell (Example 51-151) including, in the anode, the fuel cell electrode catalyst of the present invention, a fuel cell (Example 51-152) including, in the cathode, the fuel cell electrode catalyst of the present invention, and a fuel cell (Example 51-153) including, in the anode and the cathode, the fuel cell electrode catalysts of the present invention were produced. Further, performance of these fuel cells was evaluated. The results of the evaluations are shown in Table 13.

Note that the molecular metal complex expressed by the Chemical Formula (132) was synthesized in the same manner as in Example 16.

Example 53

In the same manner as in Example 36 except that the molecular metal complex expressed by the Chemical Formula (134) was used instead of the molecular metal complex expressed by the Chemical Formula (117), a fuel cell (Example 53-157) including, in the anode, the fuel cell electrode catalyst of the present invention, a fuel cell (Example 53-158) including, in the cathode, the fuel cell electrode catalyst of the present invention, and a fuel cell (Example

TABLE 13

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 48-142 | Yes | Yes | No | Chemical Formula (129) | Nafion | Nafion NRE212 | Nafion | Pt | No | Yes | Yes | 0.2 | 0.001 |
| 48-143 | Yes | Yes | Yes | Pt | Nafion | Nafion NRE212 | Nafion | Chemical Formula (129) | No | Yes | Yes | 0.15 | 0.001 |
| 48-144 | Yes | Yes | Yes | Chemical Formula (129) | Nafion | Nafion NRE212 | Nafion | Chemical Formula (129) | No | Yes | Yes | 0.1 | 0.001 |
| 49-145 | Yes | Yes | No | Chemical Formula (130) | Nafion | Nafion NRE212 | Nafion | Pt | No | Yes | Yes | 0.32 | 0.001 |
| 49-146 | Yes | Yes | Yes | Pt | Nafion | Nafion NRE212 | Nafion | Chemical Formula (130) | No | Yes | Yes | 0.3 | 0.001 |
| 49-147 | Yes | Yes | Yes | Chemical Formula (130) | Nafion | Nafion NRE212 | Nafion | Chemical Formula (130) | No | Yes | Yes | 0.1 | 0.001 |
| 50-148 | Yes | Yes | No | Chemical Formula (131) | Nafion | Nafion NRE212 | Nafion | Pt | No | Yes | Yes | 0.7 | 0.001 |
| 50-149 | Yes | Yes | Yes | Pt | Nafion | Nafion NRE212 | Nafion | Chemical Formula (131) | No | Yes | Yes | 0.7 | 0.001 |
| 50-150 | Yes | Yes | Yes | Chemical Formula (131) | Nafion | Nafion NRE212 | Nafion | Chemical Formula (131) | No | Yes | Yes | 0.4 | 0.001 |
| 51-151 | Yes | Yes | No | Chemical Formula (132) | Nafion | Nafion NRE212 | Nafion | Pt | No | Yes | Yes | 0.7 | 0.001 |
| 51-152 | Yes | Yes | Yes | Pt | Nafion | Nafion NRE212 | Nafion | Chemical Formula (132) | No | Yes | Yes | 0.6 | 0.001 |
| 51-153 | Yes | Yes | Yes | Chemical Formula (132) | Nafion | Nafion NRE212 | Nafion | Chemical Formula (132) | No | Yes | Yes | 0.4 | 0.001 |

Example 52

In the same manner as in Example 36 except that the molecular metal complex expressed by the Chemical Formula (133) was used instead of the molecular metal complex expressed by the Chemical Formula (117), a fuel cell (Example 52-154) including, in the anode, the fuel cell electrode catalyst of the present invention, a fuel cell (Example 52-155) including, in the cathode, the fuel cell electrode catalyst of the present invention, and a fuel cell (Example 52-156) including, in the anode and the cathode, the fuel cell electrode catalysts of the present invention were produced. Further, performance of these fuel cells was evaluated. The results of the evaluations are shown in Table 14.

Note that the molecular metal complex expressed by the Chemical Formula (133) was synthesized in the same manner as in Example 17.

53-159) including, in the anode and the cathode, the fuel cell electrode catalysts of the present invention were produced. Further, performance of these fuel cells was evaluated. The results of the evaluations are shown in Table 14.

Note that the molecular metal complex expressed by the Chemical Formula (134) was synthesized in the same manner as in Example 18.

Example 54

In the same manner as in Example 36 except that the molecular metal complex expressed by the Chemical Formula (135) was used instead of the molecular metal complex expressed by the Chemical Formula (117), a fuel cell (Example 54-160) including, in the anode, the fuel cell electrode catalyst of the present invention, a fuel cell (Example 54-161) including, in the cathode, the fuel cell electrode catalyst of the present invention, and a fuel cell (Example 54-162) including, in the anode and the cathode, the fuel cell electrode catalysts of the present invention were produced.

Further, performance of these fuel cells was evaluated. The results of the evaluations are shown in Table 14.

Note that the molecular metal complex expressed by the Chemical Formula (135) was synthesized in the same manner as in Example 19.

Example 55

In the same manner as in Example 36 except that the molecular metal complex expressed by the Chemical Formula (136) was used instead of the molecular metal complex expressed by the Chemical Formula (117), a fuel cell (Example 55-163) including, in the anode, the fuel cell electrode catalyst of the present invention, a fuel cell (Example 55-164) including, in the cathode, the fuel cell electrode catalyst of the present invention, and a fuel cell (Example 55-165) including, in the anode and the cathode, the fuel cell electrode catalysts of the present invention were produced. Further, performance of these fuel cells was evaluated. The results of the evaluations are shown in Table 14.

Note that the molecular metal complex expressed by the Chemical Formula (136) was synthesized in the same manner as in Example 20.

Example 56

In the same manner as in Example 36 except that the molecular metal complex expressed by the Chemical Formula (137) was used instead of the molecular metal complex expressed by the Chemical Formula (117), a fuel cell (Example 56-166) including, in the anode, the fuel cell electrode catalyst of the present invention, a fuel cell (Example 56-167) including, in the cathode, the fuel cell electrode catalyst of the present invention, and a fuel cell (Example 56-168) including, in the anode and the cathode, the fuel cell electrode catalysts of the present invention were produced. Further, performance of these fuel cells was evaluated. The results of the evaluations are shown in Table 15.

Note that the molecular metal complex expressed by the Chemical Formula (137) was synthesized in the same manner as in Example 21.

Example 57

In the same manner as in Example 36 except that the molecular metal complex expressed by the Chemical Formula (138) was used instead of the molecular metal complex expressed by the Chemical Formula (117), a fuel cell (Example 57-169) including, in the anode, the fuel cell electrode catalyst of the present invention, a fuel cell (Example 57-170) including, in the cathode, the fuel cell electrode catalyst of the present invention, and a fuel cell (Example 57-171) including, in the anode and the cathode, the fuel cell electrode catalysts of the present invention were produced. Further, performance of these fuel cells was evaluated. The results of the evaluations are shown in Table 15.

Note that the molecular metal complex expressed by the Chemical Formula (138) was synthesized in the same manner as in Example 22.

TABLE 14

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A cm$^{-2}$ |
|---|---|---|---|---|---|---|---|---|---|---|---|---|---|
| 52-154 | Yes | Yes | No | Chemical Formula (133) | Nafion | Nafion NRE212 | Nafion | Pt | No | Yes | Yes | 0.6 | 0.001 |
| 52-155 | Yes | Yes | Yes | Pt | Nafion | Nafion NRE212 | Nafion | Chemical Formula (133) | No | Yes | Yes | 0.6 | 0.001 |
| 52-156 | Yes | Yes | Yes | Chemical Formula (133) | Nafion | Nafion NRE212 | Nafion | Chemical Formula (133) | No | Yes | Yes | 0.4 | 0.001 |
| 53-157 | Yes | Yes | No | Chemical Formula (134) | Nafion | Nafion NRE212 | Nafion | Pt | No | Yes | Yes | 0.6 | 0.001 |
| 53-158 | Yes | Yes | Yes | Pt | Nafion | Nafion NRE212 | Nafion | Chemical Formula (134) | No | Yes | Yes | 0.6 | 0.001 |
| 53-159 | Yes | Yes | Yes | Chemical Formula (134) | Nafion | Nafion NRE212 | Nafion | Chemical Formula (134) | No | Yes | Yes | 0.3 | 0.001 |
| 54-160 | Yes | Yes | No | Chemical Formula (135) | Nafion | Nafion NRE212 | Nafion | Pt | No | Yes | Yes | 0.6 | 0.001 |
| 54-161 | Yes | Yes | Yes | Pt | Nafion | Nafion NRE212 | Nafion | Chemical Formula (135) | No | Yes | Yes | 0.5 | 0.001 |
| 54-162 | Yes | Yes | Yes | Chemical Formula (135) | Nafion | Nafion NRE212 | Nafion | Chemical Formula (135) | No | Yes | Yes | 0.4 | 0.001 |
| 55-163 | Yes | Yes | No | Chemical Formula (136) | Nafion | Nafion NRE212 | Nafion | Pt | No | Yes | Yes | 0.6 | 0.001 |
| 55-164 | Yes | Yes | Yes | Pt | Nafion | Nafion NRE212 | Nafion | Chemical Formula (136) | No | Yes | Yes | 0.6 | 0.001 |
| 55-165 | Yes | Yes | Yes | Chemical Formula (136) | Nafion | Nafion NRE212 | Nafion | Chemical Formula (136) | No | Yes | Yes | 0.3 | 0.001 |

Example 58

In the same manner as in Example 36 except that the molecular metal complex expressed by the Chemical Formula (139) was used instead of the molecular metal complex expressed by the Chemical Formula (117), a fuel cell (Example 58-172) including, in the anode, the fuel cell electrode catalyst of the present invention, a fuel cell (Example 58-173) including, in the cathode, the fuel cell electrode catalyst of the present invention, and a fuel cell (Example 58-174) including, in the anode and the cathode, the fuel cell electrode catalysts of the present invention were produced. Further, performance of these fuel cells was evaluated. The results of the evaluations are shown in Table 15.

Note that the molecular metal complex expressed by the Chemical Formula (139) was synthesized in the same manner as in Example 23.

As shown in Tables 1 to 6 and 10 to 14, the molecular metal complex in the form of a solid in some cases had an electromotive force which was different from that of the molecular metal complex in the form of a solution. In particular, the respective molecular metal complexes expressed by Chemical Formulae (131) and (133) to (138) each had an electromotive force that was significantly larger when the molecular metal complex was in the form of a solution than when it was in the form of a solid. This difference is presumed to stem from a difference in nature between the molecular metal complex in the form of a solid and that in the form of a solution. This presumably explains why some molecular metal complexes expressed a better function in the form of a solid, whereas other molecular metal complexes expressed a better function in the form of a solution.

Example 59

At the hydrogen electrode (anode) in the fuel cell, the molecular metal complex expressed by Chemical Formula (131) was observed to undergo an isotope exchange reaction between water and heavy hydrogen. The evaluation of the respective fuel cells of Examples 50-148 and 50-150 involved $D_2O$ as water to moisture the anode and $H_2$ as hydrogen gas, and analyzed exhaust gas at the anode by gas chromatography. The evaluation resulted in detection of $D_2$ gas in an amount that was five times as large as the amount of the molecular metal complex (10 mg) expressed by Chemical Formula (131).

The evaluation further involved $H_2O$ as water to moisture the anode and $D_2$ gas as hydrogen gas, and analyzed exhaust gas at the anode by gas chromatography. The evaluation resulted in detection of $H_2$ gas in an amount that was five times as large as the amount of the molecular metal complex (10 mg) expressed by Chemical Formula (131). The above gas chromatography analysis was made in reference to B. Kure, T. Matsumoto, K. Ichikawa, S. Fukuzumi, Y. Higuchi, T. Yagi, S. Ogo, Dalton Trans., 2008, 4747-4755.

During measurements of the above isotope exchange reaction, measurements of electromotive forces were also made. Even in the case where the isotope exchange reaction occurred, the respective electromotive forces had the same measured values as in Examples 50-148 and 50-150 (Table 13).

Example 60

At the hydrogen electrode (anode) in the fuel cell, the molecular metal complex expressed by Chemical Formula (132) was observed to undergo an isotope exchange reaction between water and heavy hydrogen. The evaluation of the respective fuel cells of Examples 51-151 and 51-153 involved $D_2O$ as water to moisture the anode and $H_2$ as hydrogen gas, and analyzed exhaust gas at the anode by gas chromatography. The evaluation resulted in detection of $D_2$ gas in an amount that was five times as large as the amount of the molecular metal complex (10 mg) expressed by Chemical Formula (132).

The evaluation further involved $H_2O$ as water to moisture the anode and $D_2$ gas as hydrogen gas, and analyzed exhaust gas at the anode by gas chromatography. The evaluation resulted in detection of $H_2$ gas in an amount that was five times as large as the amount of the molecular metal complex (10 mg) expressed by Chemical Formula (132). The above gas chromatography analysis was made in reference to B. Kure, T. Matsumoto, K. Ichikawa, S. Fukuzumi, Y. Higuchi, T. Yagi, S. Ogo, Dalton Trans., 2008, 4747-4755.

During measurements of the above isotope exchange reaction, measurements of electromotive forces were also made. Even in the case where the isotope exchange reaction occurred, the respective electromotive forces had the same measured values as in Examples 51-151 and 51-153 (Table 13).

Example 61

At the hydrogen electrode (anode) in the fuel cell, the molecular metal complex expressed by Chemical Formula (133) was observed to undergo an isotope exchange reaction between water and heavy hydrogen. The evaluation of the respective fuel cells of Examples 52-154 and 52-156 involved $D_2O$ as water to moisture the anode and $H_2$ as hydrogen gas, and analyzed exhaust gas at the anode by gas chromatography. The evaluation resulted in detection of $D_2$ gas in an amount that was five times as large as the amount of the molecular metal complex (10 mg) expressed by Chemical Formula (133).

The evaluation further involved $H_2O$ as water to moisture the anode and $D_2$ gas as hydrogen gas, and analyzed exhaust gas at the anode by gas chromatography. The evaluation resulted in detection of $H_2$ gas in an amount that was five times as large as the amount of the molecular metal complex (10 mg) expressed by Chemical Formula (133). The above gas chromatography analysis was made in reference to B. Kure, T. Matsumoto, K. Ichikawa, S. Fukuzumi, Y. Higuchi, T. Yagi, S. Ogo, Dalton Trans., 2008, 4747-4755.

During measurements of the above isotope exchange reaction, measurements of electromotive forces were also made. Even in the case where the isotope exchange reaction occurred, the respective electromotive forces had the same measured values as in Examples 52-154 and 52-156 (Table 14).

Reference Example

To study the functions as an electrode catalyst for the anode and as an electrode catalyst for the cathode, measurements of the electromotive forces were made by using, as each of the anode and the cathode, a carbon cloth to which platinum carbon (manufactured by Takana Kikinzoku Kogyo K.K.) was applied.

A membrane electrode assembly (MEA) was produced by providing, on both of the hydrogen electrode side and the oxygen electrode side, carbon cloths to each of which platinum carbon TEC10V50E (manufactured by Takana Kikinzoku Kogyo K.K.) was applied so that a polymer membrane (Nafion [Registered Trademark] NRE212, manufactured by DuPont) was sandwiched by these carbon cloths. The membrane electrode assembly thus obtained was incorporated into a fuel cell (manufactured by Toyo Corporation). In this manner, a fuel cell was produced. Hydrogen and oxygen were supplied to the fuel cell thus produced, and an electromotive force of the fuel cell was measured. The result of the measurement is shown in Table 15 (Ref-175).

Note that the fuel cell thus produced was configured such that each of the hydrogen electrode (anode) and the oxygen electrode (cathode) contains Vulcan (manufactured by Cabot Corporation) and Nafion (Registered Trademark) functioning as an ionomer. Specifically, 10 mg of platinum carbon and 60 mg of Vulcan were added to 100 mg of a Nafion (Registered Trademark) solution (Nafion perfluorinated ion-exchange resin, 5 wt % soln in lower aliphatic alcohols/$H_2O$ mix [product name], manufactured by Aldrich), and the mixture was dispersed by the ultrasonic vibration machine. Then, the resultant solution was applied to a carbon cloth.

TABLE 15

| | Carbon cloth | Vulcan | Conductive polymer | Hydrogen electrode | Ionomer | Polymer membrane | Ionomer | Oxygen electrode | Conductive polymer | Vulcan | Carbon cloth | Electromotive force/V | Maximum current/ A $cm^{-2}$ |
|---|---|---|---|---|---|---|---|---|---|---|---|---|---|
| 56-166 | Yes | Yes | No | Chemical Formula (137) | Nafion | Nafion NRE212 | Nafion | Pt | No | Yes | Yes | 0.7 | 0.001 |
| 56-167 | Yes | Yes | Yes | Pt | Nafion | Nafion NRE212 | Nafion | Chemical Formula (137) | No | Yes | Yes | 0.6 | 0.001 |
| 56-168 | Yes | Yes | Yes | Chemical Formula (137) | Nafion | Nafion NRE212 | Nafion | Chemical Formula (137) | No | Yes | Yes | 0.4 | 0.001 |
| 57-169 | Yes | Yes | No | Chemical Formula (138) | Nafion | Nafion NRE212 | Nafion | Pt | No | Yes | Yes | 0.6 | 0.001 |
| 57-170 | Yes | Yes | Yes | Pt | Nafion | Nafion NRE212 | Nafion | Chemical Formula (138) | No | Yes | Yes | 0.5 | 0.001 |
| 57-171 | Yes | Yes | Yes | Chemical Formula (138) | Nafion | Nafion NRE212 | Nafion | Chemical Formula (138) | No | Yes | Yes | 0.3 | 0.001 |
| 58-172 | Yes | Yes | No | Chemical Formula (139) | Nafion | Nafion NRE212 | Nafion | Pt | No | Yes | Yes | 0.3 | 0.001 |
| 58-173 | Yes | Yes | Yes | Pt | Nafion | Nafion NRE212 | Nafion | Chemical Formula (139) | No | Yes | Yes | 0.3 | 0.001 |
| 58-174 | Yes | Yes | Yes | Chemical Formula (139) | Nafion | Nafion NRE212 | Nafion | Chemical Formula (139) | No | Yes | Yes | 0.2 | 0.001 |
| Ref-175 | Yes | Yes | No | Pt | Nafion | Nafion NRE212 | Nafion | Pt | No | Yes | Yes | 0.95 | 1.6 |

INDUSTRIAL APPLICABILITY

A fuel cell electrode catalyst of the present invention is an economical fuel cell electrode catalyst which can be used in place of platinum as a simple substance or a platinum alloy and has easy-to-control catalytic power. Therefore, the fuel cell electrode catalyst of the present invention, a fuel cell electrode including the fuel cell electrode catalyst, a fuel cell including the fuel cell electrode catalyst, and an electric power generation method using the fuel cell electrode catalyst is applicable to electric vehicles, household power sources, portable power sources, and the like each of which includes the same. Thus, the present invention is very useful.

The invention claimed is:

1. An electric power generation method comprising:
oxidizing a fuel through use of a fuel cell electrode catalyst and
reducing an oxidant through use of the fuel cell electrode catalyst;

the fuel cell electrode catalyst including one or more molecular metal complexes;

each of the one or more molecular metal complexes being a metal complex (i) having a molecular weight of 2000 or less, (ii) not having a layered structure, and (iii) including a total of one or more but not more than three metal atoms and/or metal ions to each of which three or more but not more than six ligands coordinate;

each of the one or more molecular metal complexes being a metal complex other than a porphyrin derivative, in a case where (i) said each of the one or more molecular metal complexes includes one metal atom or one metal ion and (ii) four ligands coordinate to the one metal atom or the one metal ion, wherein the fuel cell electrode catalyst comprises a molecular metal complex expressed by Chemical Formula (132):

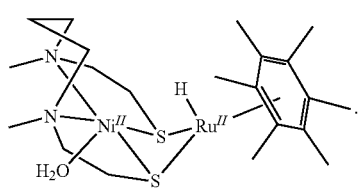

(132)

2. An electric power generation method comprising:
oxidizing a fuel through use of a fuel cell electrode catalyst;

the fuel cell electrode catalyst including one or more molecular metal complexes;

each of the one or more molecular metal complexes being a metal complex (i) having a molecular weight of 2000 or less, (ii) not having a layered structure, and (iii) including a total of one or more but not more than three metal atoms and/or metal ions to each of which three or more but not more than six ligands coordinate;

each of the one or more molecular metal complexes being a metal complex other than a porphyrin derivative, in a case where (i) said each of the one or more molecular metal complexes includes one metal atom or one metal ion and (ii) four ligands coordinate to the one metal atom or the one metal ion, wherein the fuel cell electrode catalyst comprises a molecular metal complex expressed by Chemical Formula (132):

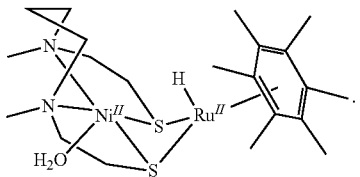

(132)

3. An electric power generation method comprising:
reducing an oxidant through use of a fuel cell electrode catalyst;
the fuel cell electrode catalyst including one or more molecular metal complexes;

each of the one or more molecular metal complexes being a metal complex (i) having a molecular weight of 2000 or less, (ii) not having a layered structure, and (iii) including a total of one or more but not more than three metal atoms and/or metal ions to each of which three or more but not more than six ligands coordinate;

each of the one or more molecular metal complexes being a metal complex other than a porphyrin derivative, in a case where (i) said each of the one or more molecular metal complexes includes one metal atom or one metal ion and (ii) four ligands coordinate to the one metal atom or the one metal ion, wherein the fuel cell electrode catalyst comprises a molecular metal complex expressed by Chemical Formula (132):

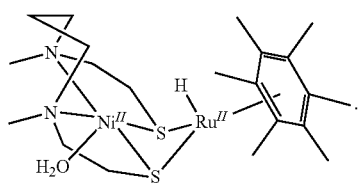

(132)

4. The electric power generation method of claim 1, wherein the oxidizing the fuel is at the anode of a fuel cell and the reducing the oxidant is at the cathode of the fuel cell.

* * * * *

UNITED STATES PATENT AND TRADEMARK OFFICE
CERTIFICATE OF CORRECTION

PATENT NO. : 10,910,654 B2
APPLICATION NO. : 15/612992
DATED : February 2, 2021
INVENTOR(S) : Seiji Ogo Page 1 of 1

It is certified that error appears in the above-identified patent and that said Letters Patent is hereby corrected as shown below:

On the Title Page

Under (30) Foreign Application Priority Date
"Oct. 6, 2009 (JP)", change to -- Jun. 10, 2009 (JP) --

Signed and Sealed this
Fourteenth Day of October, 2025

John A. Squires
*Director of the United States Patent and Trademark Office*